US008770236B2

(12) United States Patent
Reece et al.

(10) Patent No.: US 8,770,236 B2
(45) Date of Patent: Jul. 8, 2014

(54) INFLATOR APPARATUS, SYSTEM AND METHOD FOR UTILIZING THE SAME

(75) Inventors: Robert Reece, Clarkston, MI (US); John Donnay, Fenton, MI (US); David Henry Larson, Swartz Creek, MI (US); Patrick W. Zoller, Royal Oak, MI (US); Lawrence J. Lawson, Troy, MI (US)

(73) Assignee: Android Industries LLC, Auburn Hills, MI (US)

( * ) Notice: Subject to any disclaimer, the term of this patent is extended or adjusted under 35 U.S.C. 154(b) by 782 days.

(21) Appl. No.: 12/949,467

(22) Filed: Nov. 18, 2010

(65) Prior Publication Data

US 2011/0120590 A1  May 26, 2011

Related U.S. Application Data

(60) Provisional application No. 61/263,029, filed on Nov. 20, 2009.

(51) Int. Cl.
*B60C 25/00* (2006.01)
*B60C 25/14* (2006.01)

(52) U.S. Cl.
CPC .................................. *B60C 25/145* (2013.01)
USPC ............................................ 141/38; 157/1.1

(58) Field of Classification Search
CPC ...... B60C 25/145; B60C 25/132; B60C 25/00
USPC ............................................ 141/38; 157/1.1
See application file for complete search history.

(56) References Cited

U.S. PATENT DOCUMENTS 4,834,159 A * 5/1989 Burger .............................. 157/1
5,509,456 A * 4/1996 Bonko et al. ...................... 157/1
(Continued)

FOREIGN PATENT DOCUMENTS

CN         1399593 A      2/2003
CN       101426684 A      5/2009
(Continued)

OTHER PUBLICATIONS

International Search Report for Application PCT/US2010/057251 issued Aug. 2, 2011.

(Continued)

*Primary Examiner* — Timothy L Maust
*Assistant Examiner* — Robert Bell, III
(74) *Attorney, Agent, or Firm* — Honigman Miller Schwartz and Cohn LLP

(57) ABSTRACT

An inflator apparatus for inflating more than one un-inflated tire-wheel assembly is disclosed. The inflator apparatus includes a support structure; an interface portion rotatably-attached to the support structure, wherein the interface portion includes a plurality of inflator heads, wherein each inflator head of the plurality of inflator heads includes a fluid inlet; a plunger portion movably-connected to the support structure, wherein the plunger portion is movably-connected to the support structure to permit selectively coupling of the plunger portion with one inflator head of the plurality of inflator heads; and a fluid conduit connected to the plunger portion, wherein the fluid conduit is fluidly connectable with the fluid inlet of the one inflator head of the plurality of inflator heads. A system for processing more than one un-inflated tire-wheel assembly is also disclosed. A method for utilizing an inflator apparatus for inflating more than one un-inflated tire-wheel assembly is also disclosed.

16 Claims, 17 Drawing Sheets

(56) References Cited

U.S. PATENT DOCUMENTS

| | | | |
|---|---|---|---|
| 5,826,319 A * | 10/1998 | Colwell et al. | 29/407.04 |
| 5,940,960 A * | 8/1999 | Doan et al. | 29/714 |
| 6,029,716 A * | 2/2000 | Hawk | 141/38 |
| 6,463,982 B1 * | 10/2002 | Doan | 157/1.1 |
| 6,467,524 B2 * | 10/2002 | Ronge et al. | 157/1.17 |
| 6,886,231 B2 * | 5/2005 | Lawson et al. | 29/407.01 |
| 6,918,423 B2 * | 7/2005 | Pellerin et al. | 157/1.2 |
| RE39,312 E * | 10/2006 | Kane et al. | 157/1.2 |
| 7,143,890 B2 * | 12/2006 | Pellerin et al. | 198/373 |
| 7,506,671 B2 * | 3/2009 | Peinelt et al. | 141/38 |
| 7,578,052 B2 * | 8/2009 | Mondrusov et al. | 29/714 |
| 7,845,655 B2 * | 12/2010 | Lawson et al. | 280/79.4 |
| 8,096,328 B2 * | 1/2012 | Hoenke | 141/38 |
| 8,161,632 B2 * | 4/2012 | Reece et al. | 29/802 |
| 2006/0136288 A1 | 6/2006 | Peinelt et al. | |
| 2009/0084506 A1 | 4/2009 | Lawson et al. | |
| 2011/0132491 A1 * | 6/2011 | Donnay et al. | 141/38 |
| 2012/0125542 A1 * | 5/2012 | Lawson et al. | 157/1.17 |
| 2012/0138190 A1 * | 6/2012 | Lawson et al. | 141/38 |

FOREIGN PATENT DOCUMENTS

| | | |
|---|---|---|
| CN | 101468582 A | 7/2009 |
| JP | 06270619 A | 9/1994 |
| JP | 07-004105 A | 1/1995 |

OTHER PUBLICATIONS

Canadian Office Action for Application No. 2,779,372 dated Oct. 4, 2013.

Chinese Office Action for Application 20100052193.5 dated Jan. 30, 2014.

* cited by examiner

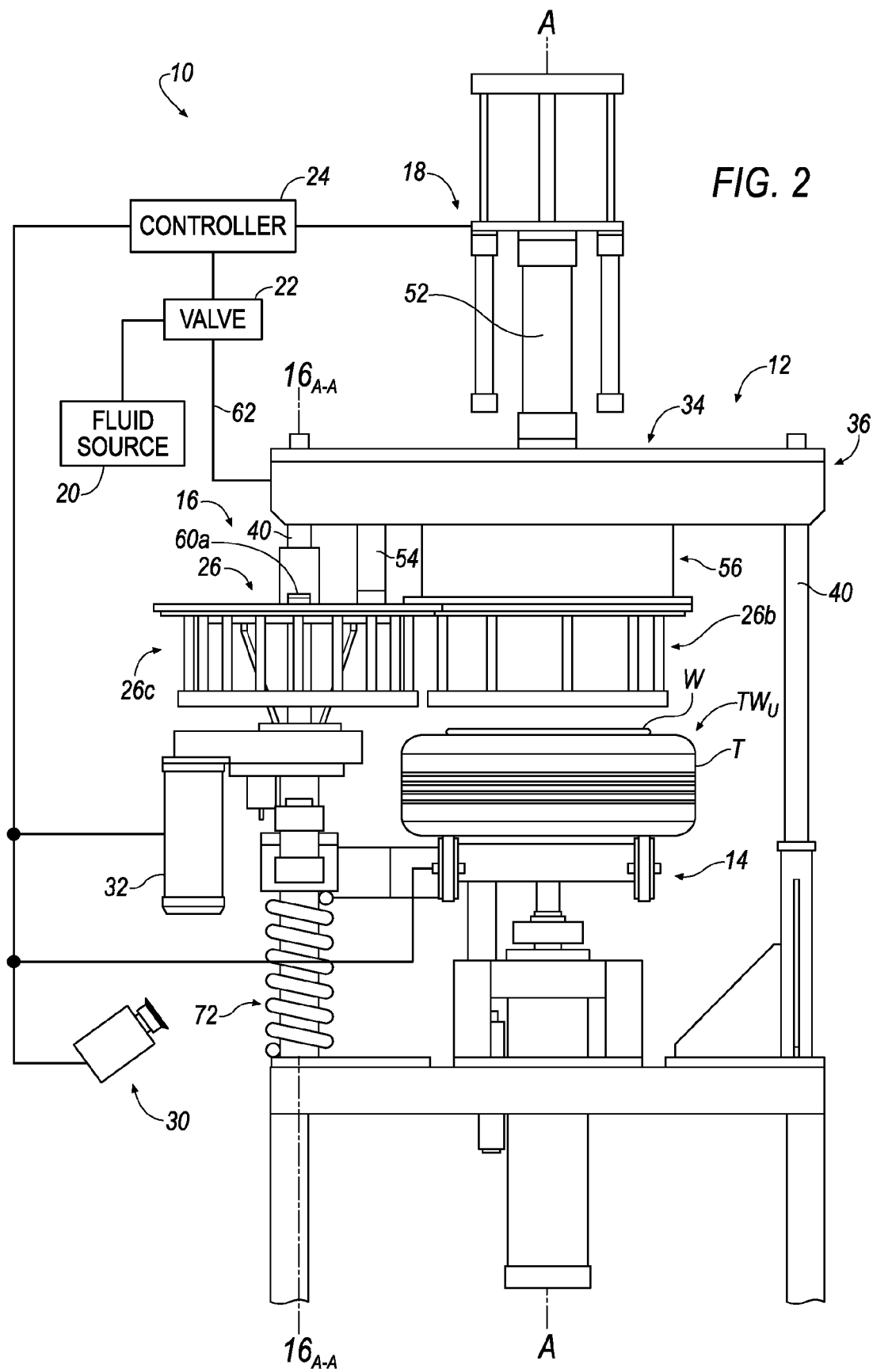

INFLATOR APPARATUS, SYSTEM AND METHOD FOR UTILIZING THE SAME

RELATED APPLICATION

This Application claims the benefit of U.S. Provisional Application 61/263,029 filed on Nov. 20, 2009, which is entirely incorporated herein by reference.

FIELD OF THE INVENTION

The disclosure relates to tire-wheel assemblies and to a method and apparatus for processing a tire-wheel assembly.

DESCRIPTION OF THE RELATED ART

It is known in the art that a tire-wheel assembly is processed in several steps. Usually, conventional methodologies that conduct such steps require a significant capital investment and human oversight. The present invention overcomes drawbacks associated with the prior art by setting forth a device utilized for processing a tire-wheel assembly.

BRIEF DESCRIPTION OF THE DRAWINGS

The disclosure will now be described, by way of example, with reference to the accompanying drawings, in which:

FIG. 2 illustrates a side view of an inflator apparatus in accordance with an exemplary embodiment of the invention;

DETAILED DESCRIPTION OF THE INVENTION

The Figures illustrate an exemplary embodiment of an inflator apparatus, system and method for utilizing the same in accordance with an embodiment of the invention. Based on the foregoing, it is to be generally understood that the nomenclature used herein is simply for convenience and the terms used to describe the invention should be given the broadest meaning by one of ordinary skill in the art.

An inflator apparatus is shown generally at 10 in FIGS. 1-3D according to an embodiment of the invention. The inflator apparatus 10 is utilized for inflating an un-inflated tire-wheel assembly, $TW_U$, including a tire, T, mounted to a wheel, W.

Figure 1:
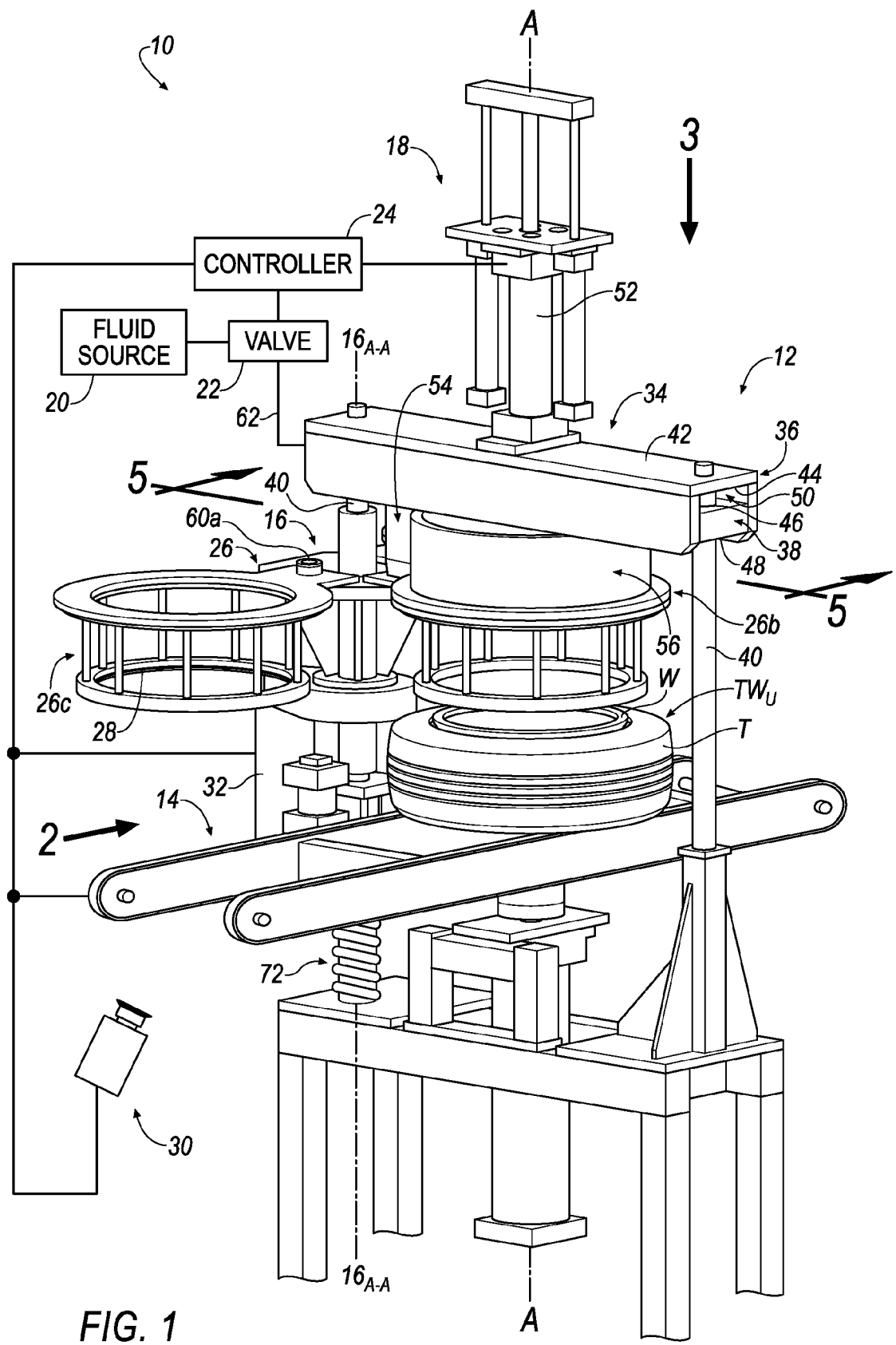
FIG. 1 illustrates a perspective view of an inflator apparatus in accordance with an exemplary embodiment of the invention.

Referring to FIGS. 1-2, in an embodiment, the inflator apparatus 10 includes a support structure 12, a conveyor portion 14, an interface portion 16, an actuator portion 18, a fluid source 20 and a valve 22. In an embodiment, the inflator apparatus 10 also includes a controller 24; as will be explained in the foregoing disclosure, the controller 24 may be utilized for controlling one or more of the conveyor portion 14, interface portion 16, actuator portion 18 and valve 22.

Figure 3A:
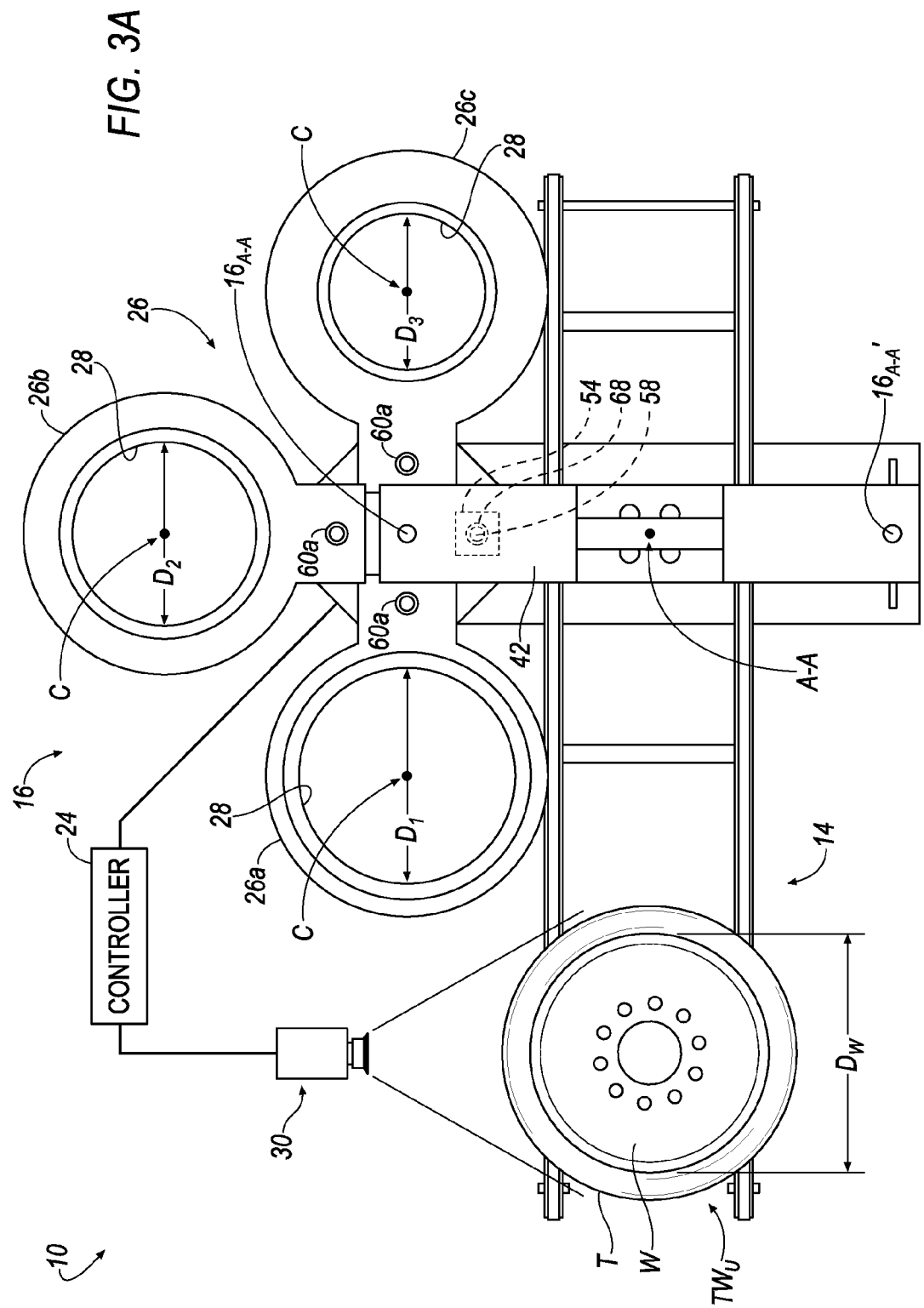
FIG. 3A-3D illustrate top views of an inflator apparatus in accordance with an exemplary embodiment of the invention.

Referring to FIG. 3A, a top view of the inflator apparatus 10 is shown according to an embodiment of the invention. In an embodiment, the interface portion 16 is shown to include a plurality of inflator heads 26. In an embodiment, the plurality of inflator heads 26 include a first inflator head 26a, a second inflator head 26b and a third inflator head 26c. As will be explained in the foregoing disclosure, the inflator apparatus 10 operates in a manner to permit one of the plurality of inflator heads 26 to be rotated, R (see, e.g., FIGS. 3B-3D), to a position that is coaxially aligned with an axial center of an un-inflated tire-wheel assembly, $TW_U$, that is located upon the conveyor portion 14, and, subsequently, the coaxially-aligned inflator head 26a, 26b, 26c of the plurality of inflator heads 26 is axially moved (according to the direction of arrow, P (see, e.g., FIGS. 5A-5C) in order to be interfaced with the un-inflated tire-wheel assembly, $TW_U$, in order to inflate (see, e.g., FIGS. 5D-5F) the tire, T, that is mounted to the wheel, W.

As seen in FIG. 3A, the interface portion 16 is said to be in a "neutral orientation" such that no inflator head 26a, 26b, 26c of the plurality of inflator heads 26 is located in a substantially directly-opposing relationship (i.e., substantially directly over/above) the conveyor portion 14. In an embodiment, a "use orientation" of the interface portion 16 is provided when one of the plurality of inflator heads 26 is moved according to the direction of the arrow, R (see, e.g., FIGS. 3B-3D). When moved according to the direction of the arrow, R, an inflator head 26a, 26b, 26c of the plurality of inflator heads 26 is said to be arranged in a substantially directly-opposing relationship with the conveyor portion 14. In an embodiment, the "use orientation" may occur when an axial center, C, of one of the plurality of inflator heads 26 is coaxially-aligned with a central/plunging axis, A-A, of the inflator apparatus 10.

In an embodiment, each inflator head 26a, 26b, 26c of the plurality of inflator heads 26 may include a substantially annular, ring-shaped seal portion 28 that permits the interface portion 16 to inflate an un-inflated tire-wheel assembly, $TW_U$. As seen in FIG. 3A, the substantially annular, ring-shaped seal portion 28 of each inflator head 26a, 26b, 26c of the plurality of inflator heads 26 is comparatively unique.

In an embodiment, the substantially annular, ring-shaped seal portion 28 of the first inflator head 26a includes an opening defined by an inner diameter, $D_1$, that is greater than an opening defined by an inner diameter, $D_2$, of the substantially annular, ring-shaped seal portion 28 of the second inflator head 26b, and, the inner diameter, $D_2$, of the substantially annular, ring-shaped seal portion 28 of the second inflator head 26b is greater than an opening defined by an inner diameter, $D_3$, of the substantially annular, ring-shaped seal portion 28 of the third inflator head 26c. Thus, it will be appreciated that the different inner diameters, $D_1$-$D_3$, provided by each inflator head 26a, 26b, 26c of the plurality of inflator heads 26 does not limit the inflation apparatus 10 to inflate one particularly-sized un-inflated tire-wheel assembly, $TW_U$, having a particular diameter, and, as such, in an embodiment, the inflator apparatus 10 illustrated in FIGS. 1-3C may accommodate at least three un-inflated tire-wheel assemblies, $TW_U$, having one of three unique geometries that corresponds to an inner diameter of the substantially annular, ring-shaped seal portion 28 of one of the plurality of inflator heads 26.

Referring to FIG. 3A, an un-inflated tire-wheel assembly, $TW_U$, may be disposed upon the conveyor portion 14, and, the interface portion 16 may be arranged in the "neutral orientation." In an embodiment, the inflator apparatus 10 may further comprise, for example, a sensor 30 connected to the controller 24 in order to, for example, assist in determining which inflator head 26a, 26b, 26c of the plurality of inflator heads 26 corresponds to the geometry of the un-inflated tire-wheel assembly, $TW_U$.

In an embodiment, the sensor 30 may capture an image of the geometry of the un-inflated tire-wheel assembly, $TW_U$. In an embodiment, the geometry of the un-inflated tire-wheel assembly, $TW_U$, may include, for example, the diameter, $D_W$, of the wheel, W, of the un-inflated tire-wheel assembly, $TW_U$.

Upon imaging the diameter, $D_W$, of the wheel, W, the sensor 30 may send the captured image to the controller 24 to comparatively determine which of the inner diameters, $D_1$-$D_3$, provided by each inflator head 26a, 26b, 26c is substantially similar/corresponds to the imaged diameter, $D_W$, of the wheel, W. Upon determining the corresponding relationship of the imaged diameter, $D_W$, of the wheel, W, to one of the inner diameters, $D_1$-$D_3$, provided by each inflator head 26a, 26b, 26c, the controller 24 cause the interface portion 16 to move to an "use orientation" according to the direction of the arrow, R, to permit subsequent interfacing of a corresponding inflator head 26a, 26b, 26c with the imaged, un-inflated tire-wheel assembly, $TW_U$.

Figure 5A:
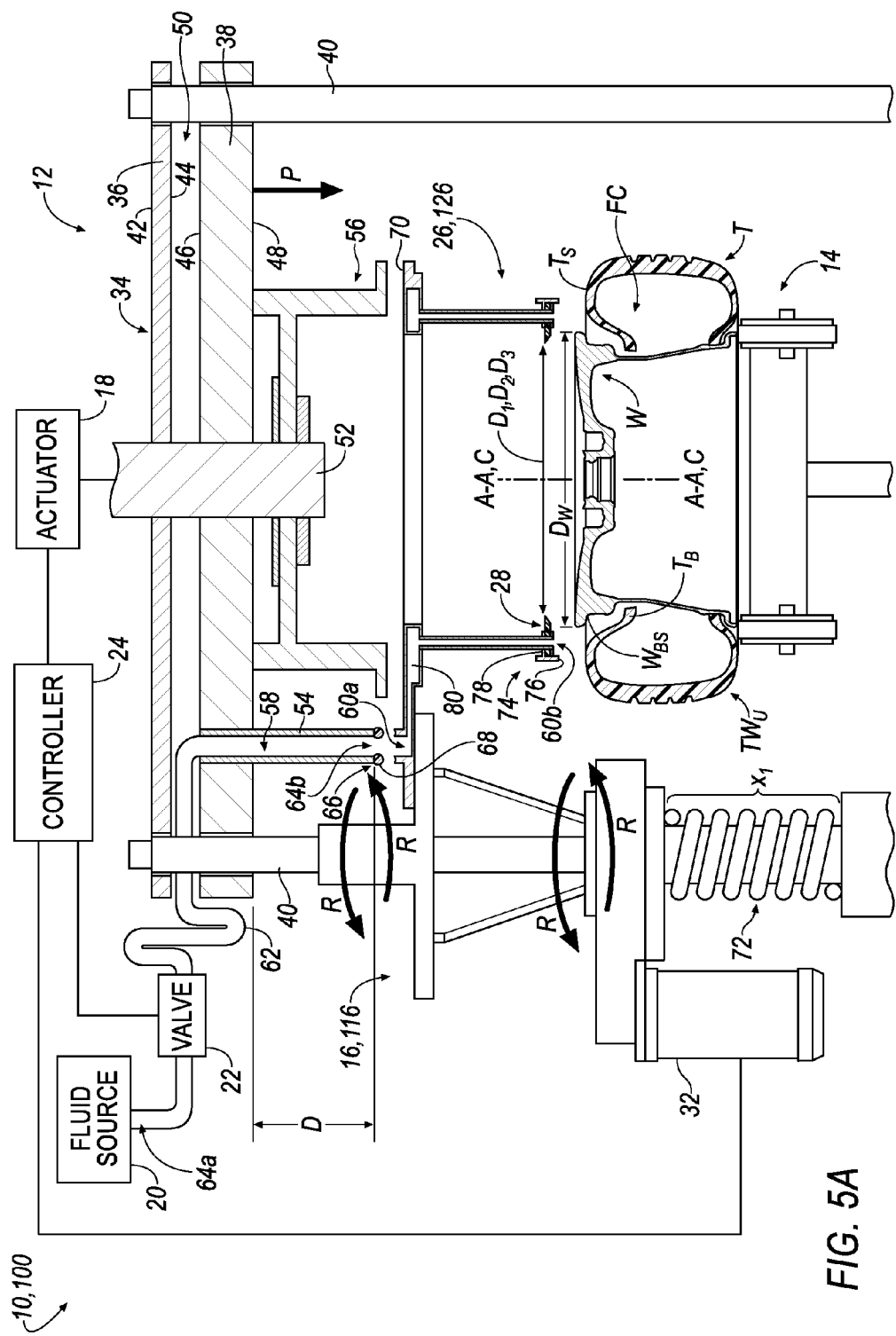
FIGS. 5A-5F illustrate enlarged, partial side views of an inflator apparatus inflating a tire-wheel assembly in accordance with an exemplary embodiment of the invention.

In an embodiment, the corresponding relationship of one of the inner diameters, $D_1$-$D_3$, of the substantially annular, ring-shaped seal portions 28 of one of the plurality of inflator heads 26 with the un-inflated tire-wheel assembly, $TW_U$, with the diameter, $D_W$, of the wheel, W, of the un-inflated tire-wheel assembly, $TW_U$, is best shown, for example in FIG. 5A. As seen in FIG. 5A, for example, the inner diameter, $D_1$, $D_2$, $D_3$, of one of the substantially annular, ring-shaped seal portions 28 of one of the plurality of inflator heads 26 may be determined to be about the same as, but slightly less than the diameter, $D_W$, of the wheel, W, of the un-inflated tire-wheel assembly, $TW_U$.

Referring back to FIG. 3A, upon, for example, the controller 24 determining which inflator head 26a, 26b, 26c of the plurality of inflator heads 26 corresponds to the un-inflated tire-wheel assembly, $TW_U$, the interface portion 16 may be rotated about an axis, $16_{A-A}$, according to the direction of one of the arrows, R (see, e.g., FIGS. 3B-3D), in order to arrange the interface portion 16 in the "use orientation." In an embodiment, rotation, R, of the interface portion 16 may be conducted when the controller 24 sends a signal to a motor 32 (see, e.g., FIGS. 1, 2 and 5A) that is connected to the interface portion 16.

Figure 3B:
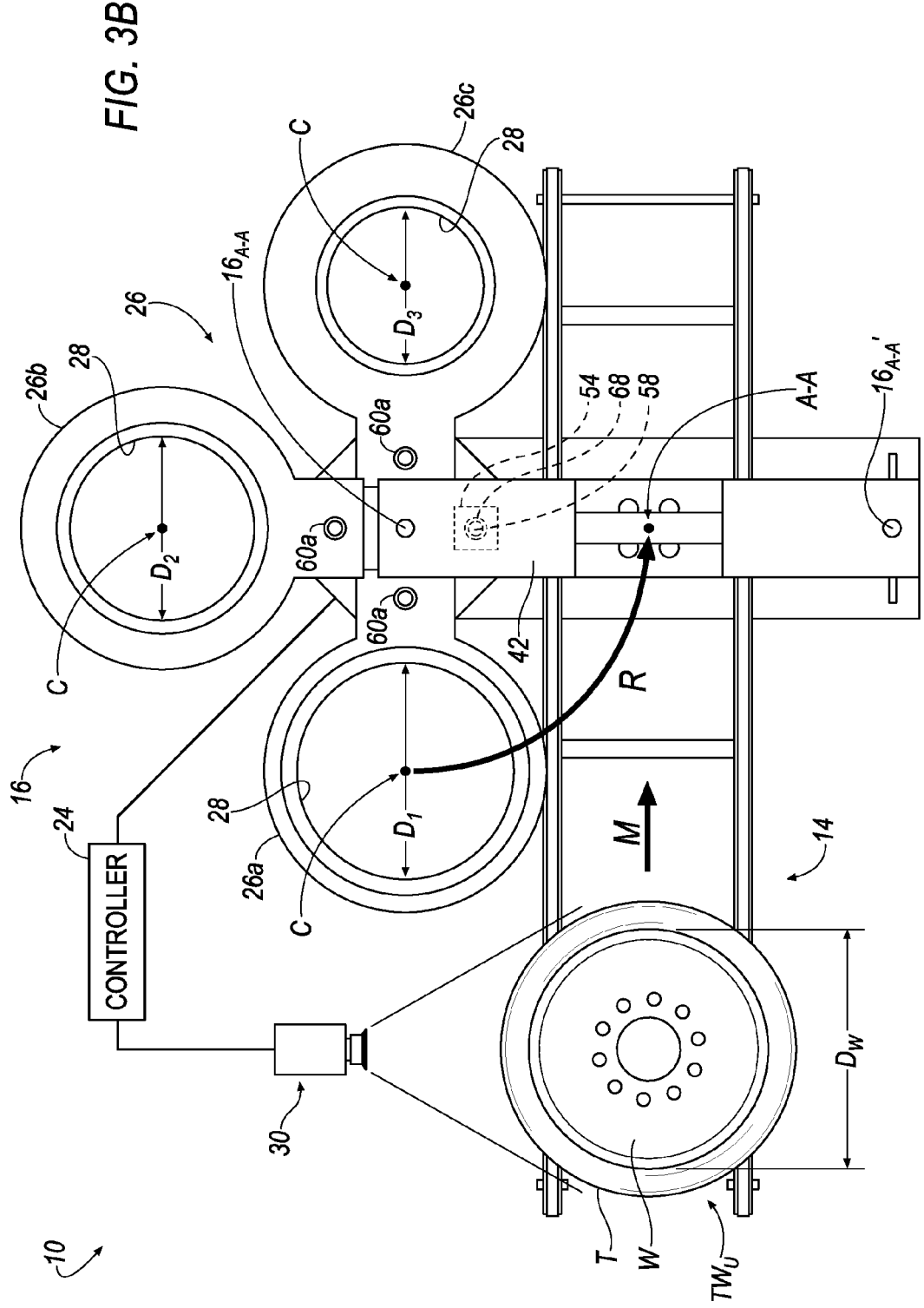
Figure 3C:
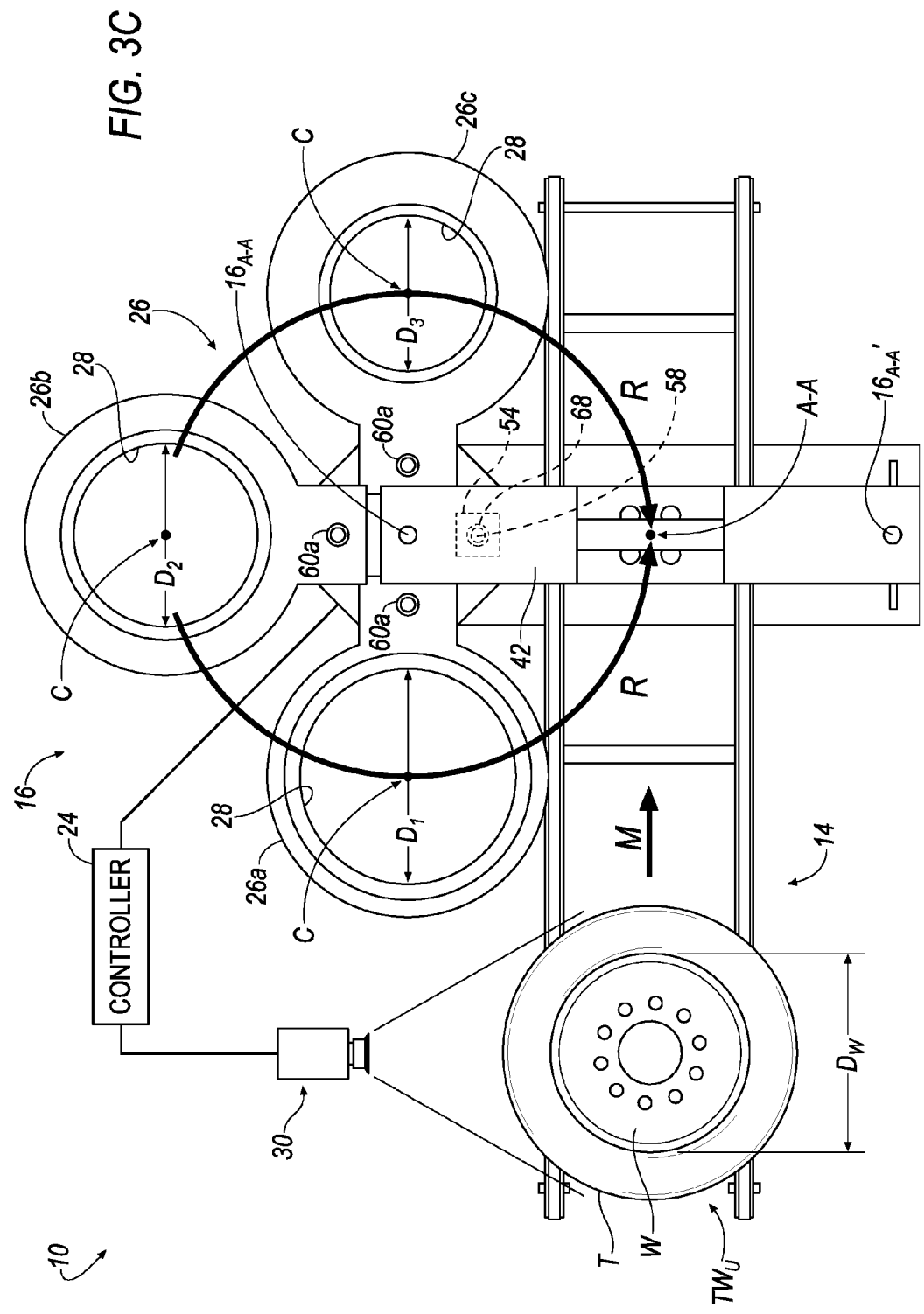
Figure 3D:
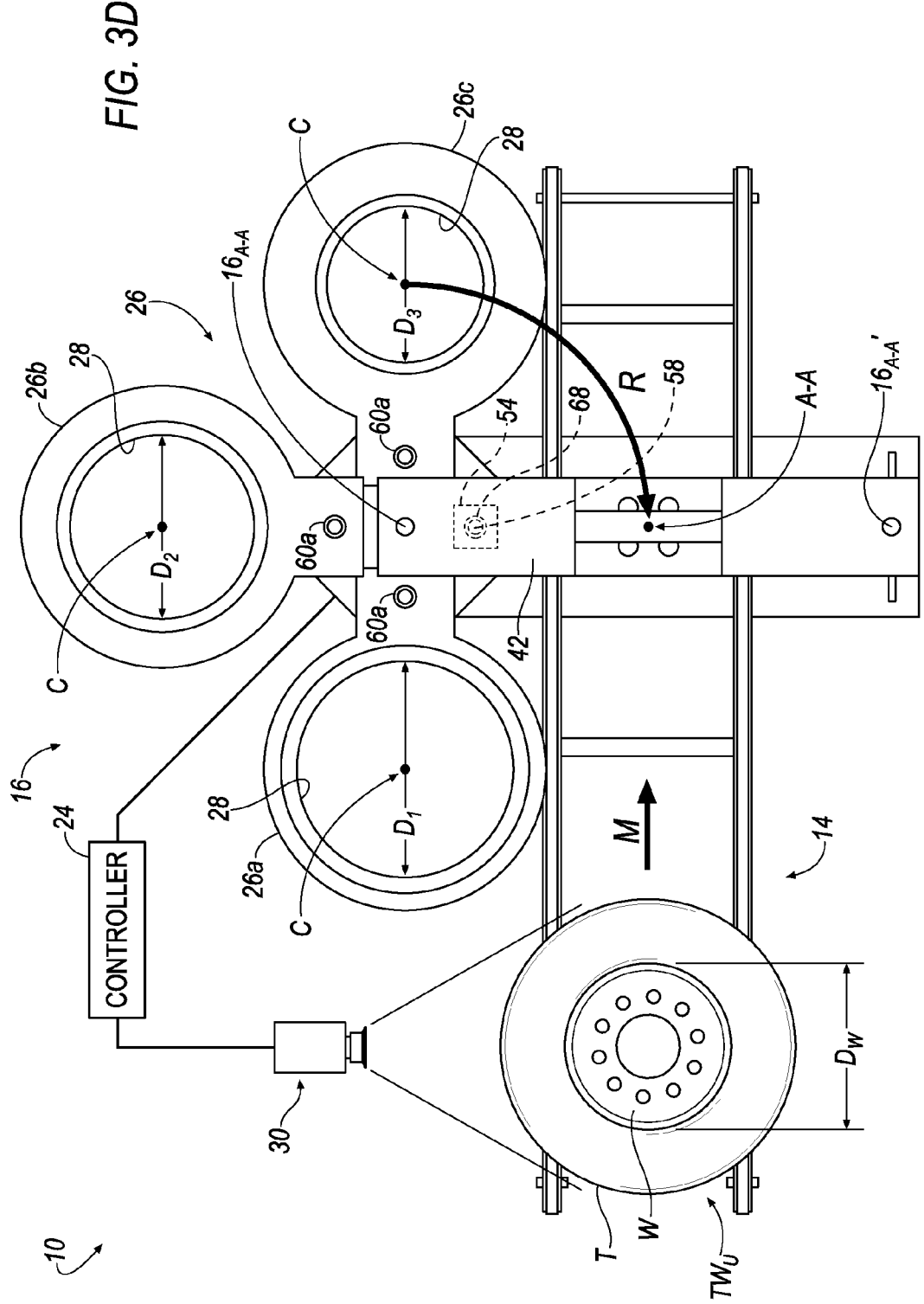

In an embodiment, the signal sent by the controller 24 to the motor 32 may provide an instruction to the motor 32 that will result in the motor 32 causing the interface portion 16 to rotate, R, about the axis, $16_{A-A}$, in one of a clockwise or counter-clockwise direction. In an embodiment, as seen in FIG. 3B, the interface portion 16 may be rotated, R, approximately 90°-counter-clockwise in order to locate the first inflator head 26a from the "neutral orientation" to the "use orientation." In an embodiment, as seen in FIG. 3C, the interface portion 16 may be rotated, R, approximately 180° clockwise or counter-clockwise in order to locate the second inflator head 26b from the "neutral orientation" to the "use orientation." In an embodiment, as seen in FIG. 3D, the interface portion 16 may be rotated, R, approximately 90°-clockwise in order to locate the third inflator head 26c from the "neutral orientation" to the "use orientation."

Figure 4:
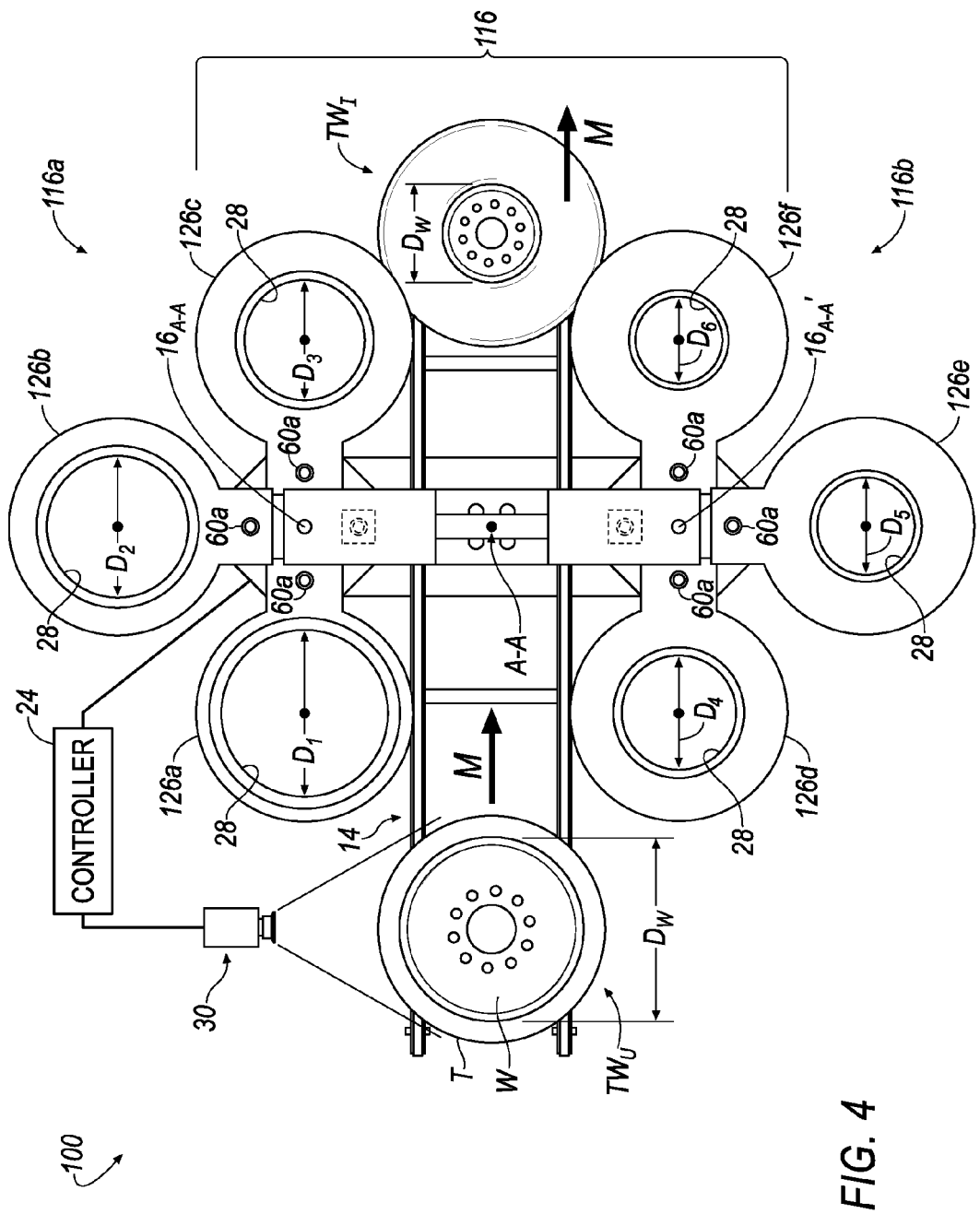
FIG. 4 illustrates a top view of an inflator apparatus in accordance with an exemplary embodiment of the invention.

Although an inflator apparatus 10 having an interface portion 16 including three inflator heads 26a, 26b, 26c has been described, it will be appreciated that the interface portion 16 is not limited to include three inflator heads 26a, 26b, 26c and that the interface portion 16 may include any desirable number of inflator heads 26a, 26b, 26c. Referring to FIG. 4, for example, an inflator apparatus is shown generally at 100 according to an embodiment of the invention; in an embodiment, the inflator apparatus 100 may include a pair of interface portions 116 each including three inflator heads 126a-126c, 126d-126f. In an embodiment, each interface portion 116a, 116b of the pair of interface portions 116 operates in a substantially similar manner as described above with respect to FIGS. 3A-3D such that the first interface portion 116a rotates, R, about the axis, $16_{A-A}$, and the second interface portion 116b rotates, R, about an axis, $16_{A-A}'$; however, it will be appreciated that each inner diameter, $D_1$-$D_6$, of the substantially annular, ring-shaped seal portion 28 of each inflator head 126a, 126b, 126c, 126d, 126e, 126f of the plurality of inflator heads 126 is unique in order to accommodate six different wheel diameters, $D_W$, of six different kinds of un-inflated tire-wheel assemblies, $TW_U$, rather than being limited to three different wheel diameters, $D_W$, as shown and described in FIGS. 3A-3D.

Referring now to FIG. 5A, before/during/after movement of an inflator head of the plurality of inflator heads 26, 126 to a "use orientation," the controller 24 may cause the conveyor portion 14 to move (according to the direction of the arrow, M, as seen, e.g., FIGS. 3B-3D) the un-inflated tire-wheel assembly, $TW_U$, such that an axial center of the un-inflated tire-wheel assembly, $TW_U$, is coaxially-aligned with an axial center, C, of the "use orientation" inflator head of the plurality of inflator heads 26, 126. Upon coaxial alignment of the un-inflated tire-wheel assembly, $TW_U$, with the "use orientation" inflator head, the controller 24 may cause the actuator portion 18 to axially move a plunger portion 34 connected to the support structure 12 according to the direction of the arrow, P, in order to, for example, fluidly-connect the fluid source 20 to the "use orientation" inflator head of the plurality of inflator heads 26, 126. In an embodiment, the actuator portion 18 may include a motor, a hydraulic ram, solenoid or the like.

With continued reference to FIG. 5A, in an embodiment, the plunger portion 34 may further comprise a first substantially horizontal flange 36 and a second substantially horizontal flange 38 that are axially-movable relative first and second axial support members 40 of the support structure 12. In an embodiment, the interface portion 16, 116 may be rotatably-connected to one/each of the first and second axial support members 40 to permit the interface portion 16, 116 to be rotated according to the direction of the arrow, R.

In an embodiment, the first substantially horizontal flange 36 and the second substantially horizontal flange 38 may be directly connected to and physically contact the first and second axial support members 40. Alternatively, in an embodiment, the first substantially horizontal flange 36 and the second substantially horizontal flange 38 may be indirectly connected to and physically contact the first and second axial support members 40 by way of, for example, an intervening gasket (not shown), seal or the like.

In an embodiment, the first substantially horizontal flange 36 includes an upper surface 42 and a lower surface 44. In an embodiment, the second substantially horizontal flange 38 includes an upper surface 46 and a lower surface 48. In an embodiment, the lower surface 44 of the first substantially horizontal flange 36 and the upper surface 46 of the second substantially horizontal flange 38 are spaced apart from one another in order to form a spacing or passage 50 between the first and second substantially horizontal flanges 36, 38.

In an embodiment, the plunger portion 34 may further comprise an axial linking member 52 that extends through and connects the first substantially horizontal flange 36 and the second substantially horizontal flange 38. In an embodiment, the axial linking member 52 may be connected to the actuator portion 18 such that the actuator portion 18 may cause movement of the axial linking member 52, and, as such, further movement of the axial linking member 52 may be transferred to one or more of the first substantially horizontal flange 36 and the second substantially horizontal flange 38.

In an embodiment, the plunger portion 34 may further comprise a substantially rigid sleeve 54 and a push member 56 each connected to the second substantially horizontal flange 38. In an embodiment, the substantially rigid sleeve 54 extends through the second substantially horizontal flange 38 from the upper surface 46 and beyond the lower surface 48 at a distance, D. In an embodiment, the substantially rigid sleeve 54 includes a passage 58.

In an embodiment, the push member 56 is connected to the lower surface 48 and extends away from the lower surface 48 at approximately, but slightly past, the distance, D. In an embodiment, the distal end of the axial linking member 52 may be connected to the push member 56.

As seen in FIG. 5A, each inflator head of the plurality of inflator heads 26, 126 includes a fluid inlet 60a and a fluid outlet 60b. In an embodiment, the plunger portion 34 supports a fluid conduit 62 (e.g., a flexible/expandable tube or the like). In an embodiment, the fluid conduit 62 extends through the spacing or passage 50 between the first and second substantially horizontal flanges 36, 38. Further, in an embodiment, the fluid conduit 62 may be further extended from within the passage 50 and through the passage 58 of the substantially rigid sleeve 54; alternatively, in an embodiment, the fluid conduit 62 may be in fluid communication with the passage 58 of the substantially rigid sleeve 54 by connecting the fluid conduit 62 to the substantially rigid, tube-shaped sleeve 54 proximate the upper surface 46 of the second substantially horizontal flange 38.

In an embodiment, the fluid conduit 62 may include a fluid inlet 64a and a fluid outlet 64b. In an embodiment, the fluid inlet 64a of the fluid conduit 62 may be connected to the fluid source 20. In an embodiment, the fluid conduit 62 may include the valve 22. In an embodiment, the fluid outlet 64b may be located proximate a distal end 66 of the substantially rigid sleeve 54, if, for example, the fluid conduit 62 is extended into and through the passage 58 of the substantially rigid sleeve 54 and beyond the lower surface 48 at approximately the distance, D.

In an embodiment, an annular, compressible seal 68 may be affixed to one or more of the fluid outlet 64b of the fluid conduit 62 and the distal end 66 of the substantially rigid, tube-shaped sleeve 54. Although the annular, compressible seal 68 is shown connected to one or more of the fluid outlet 64b of the fluid conduit 62 and the distal end 66 of the substantially rigid, tube-shaped sleeve 54, it will be appreciated that an annular, compressible seal 68 may be alternatively affixed proximate the fluid inlet 60a of each inflator head of the plurality of inflator heads 26, 126.

Figure 5B:
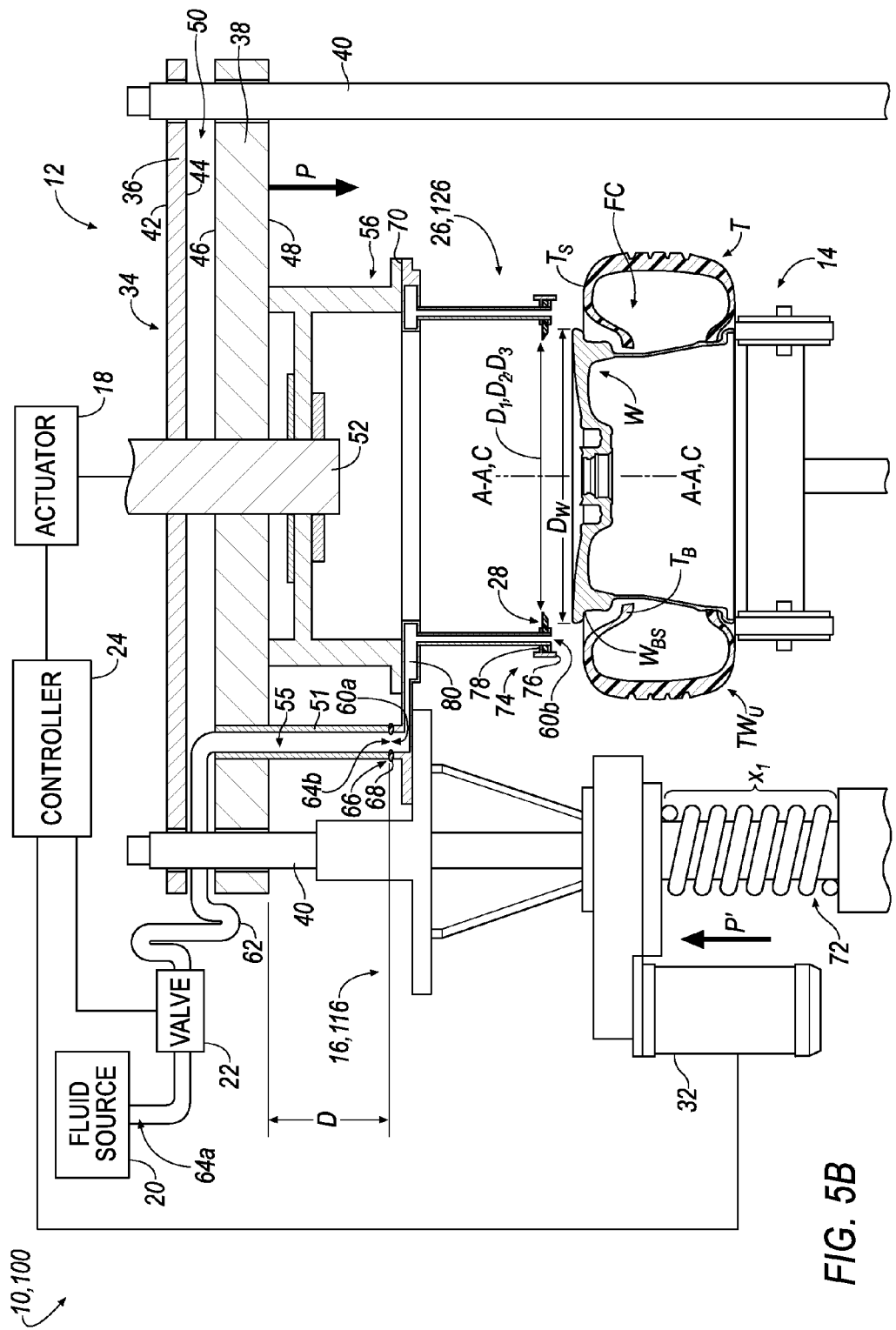

Referring to FIG. 5B, once the plunger portion 34 of the support structure 12 is moved according to the direction of the arrow, P, one or more of the distal end 66 of the substantially rigid sleeve 54 and the fluid outlet 64b of the fluid conduit 62 may be connected to the fluid inlet 60a of the "use orientation" inflator head of the plurality of inflator heads 26, 126 such that the annular seal 68 is compressed. Once one or more of the distal end 66 of the substantially rigid sleeve 54 and the fluid outlet 64b of the fluid conduit 62 is connected to the fluid inlet 60a of the "use orientation" inflator head of the plurality of inflator heads 26, 126, the "use orientation" inflator head of the plurality of inflator heads 26, 126 is said to be fluidly-connected with the fluid source 20 by way of one or more of the fluid conduit 62 and substantially rigid sleeve 54. Further, as seen in FIG. 5B, the push member 56 engages an upper surface 70 of the "use orientation" inflator head of the plurality of inflator heads 26, 126 in order for the plunger portion 34 to apply a force (according to the direction of the arrow, P) to the upper surface 70 of the "use orientation" inflator head of the plurality of inflator heads 26, 126.

In an embodiment, the application of force arising from the plunger portion 34 according to the direction of the arrow, P, to the upper surface 70 of the "use orientation" inflator head of the plurality of inflator heads 26, 126 may cause movement of the interface portion 16, 116 according to the direction of the arrow, P. Further, it will be appreciated that the force arising from the plunger portion 34 according to the direction of the arrow, P, may also be transferred to the interface portion 16, 116 by way of the distal end 66 of the substantially rigid sleeve 54 to the upper surface 70 of the "use orientation" inflator head of the plurality of inflator heads 26, 126 proximate the fluid inlet 60a of the "use orientation" inflator head of the plurality of inflator heads 26, 126.

With continued reference to FIG. 5B, the interface portion 16, 116 may further include a biasing member 72, such as, for example, a coil spring, that may provide forceful resistance according to the direction of the arrow, P', upon being compressed in order to provide some resistance to the force arising from the plunger portion 34 according to the direction of the arrow, P. As will be explained in the foregoing disclosure, once the inflation of the un-inflated tire-wheel assembly, $TW_U$, is completed, the biasing member 72 may assist in returning the plunger portion 34 to its original, at-rest state shown in FIG. 5A prior to being axially moved according to the direction of the arrow, P, by the actuator portion 18 by releasing energy stored by the biasing member 72.

Figure 5C:
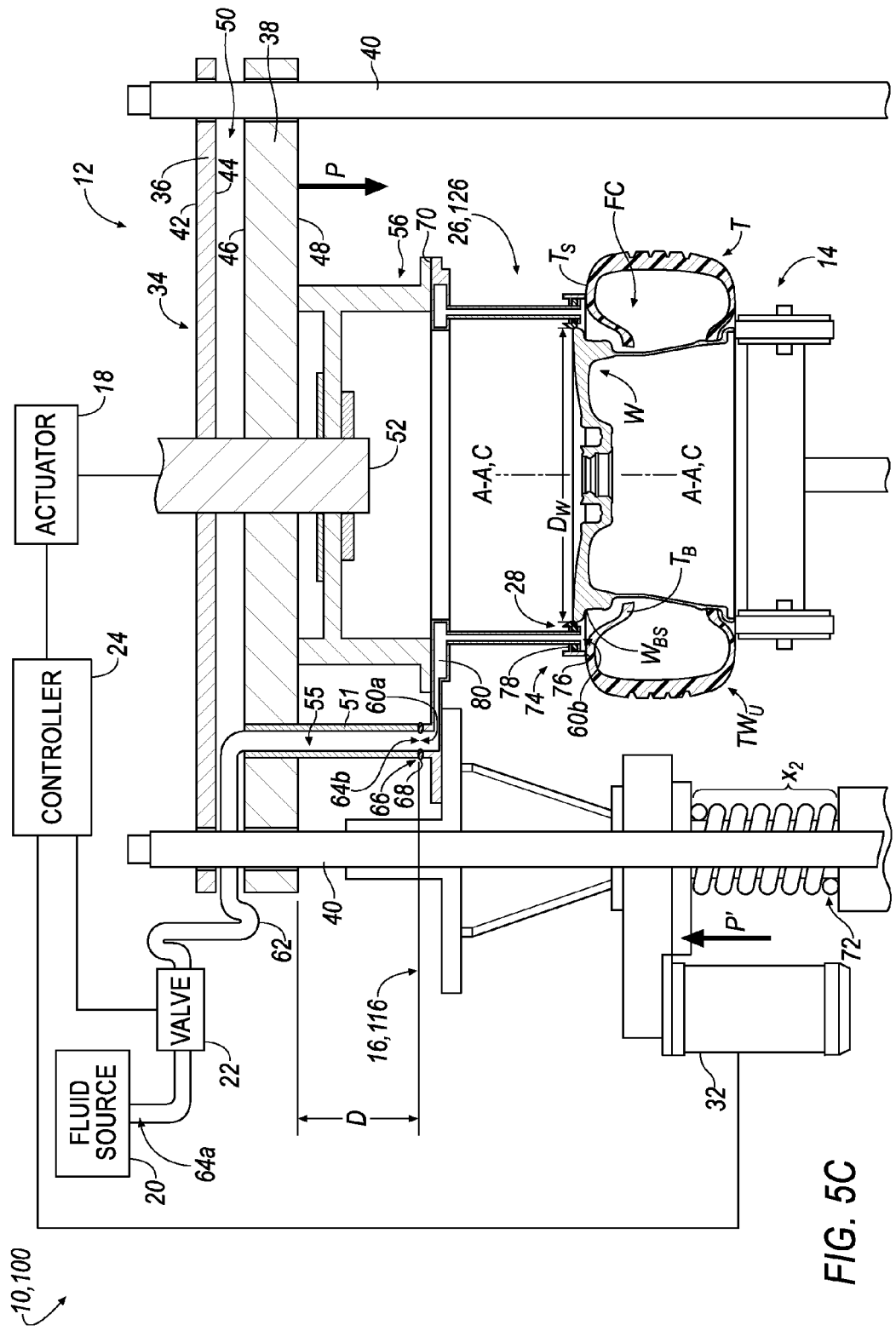

Referring to FIG. 5C, the plunger portion 34 of the support structure 12 is further moved according to the direction of the arrow, P, such that an engaging assembly 74 of the "use orientation" inflator head of the plurality of inflator heads 26, 126 engages a sidewall, $T_S$, of the tire, T. In an embodiment, an axially-projecting, annular rim body 76 of the engaging assembly 74 engages the sidewall, $T_S$, of the tire, T.

In an embodiment, the engaging assembly 74 of the "use orientation" inflator head of the plurality of inflator heads 26, 126 further includes a radially-projecting, annular rim body 78 connected to the axially-projecting, annular rim body 76. In an embodiment, the radially-projecting, annular rim body 78 is connected to the substantially annular, ring-shaped seal portion 28.

In an embodiment, approximately when the axially-projecting, annular rim body 76 of the engaging assembly 74 engages the sidewall, $T_S$, of the tire, T, the substantially annular, ring-shaped seal portion 28 of the "use orientation" inflator head of the plurality of inflator heads 26, 126 is disposed about and engages the diameter, $D_W$, of the wheel, W. As seen in FIG. 5C, because the inner diameter of the substantially annular, ring-shaped seal portion 28 is substantially the same as but slightly less than the diameter, $D_W$, of the wheel, W, the substantially annular, ring-shaped seal portion 28 is moved from a substantially planar, neutral orientation (see, e.g., FIG. 5B) such that the substantially annular, ring-shaped seal portion 28 "flips" upwardly and away from the substantially planar, neutral orientation. The "flipped" orientation of the substantially annular, ring-shaped seal portion 28 is maintained until the substantially annular, ring-shaped seal portion 28 is permitted to move back to the neutral orientation (see, e.g., FIG. 5D) by further movement of the plunger portion 34 according to the direction of the arrow, P, such that the substantially annular, ring-shaped seal portion 28 is located in a sealed, seated position adjacent a bead seat, $W_{BS}$, of the wheel, W. Further, as seen in FIG. 5C, the biasing member 72 is moved from the expanded orientation (defined by length, $X_1$) to a partially compressed orientation (defined by length, $X_2$).

Figure 5D:
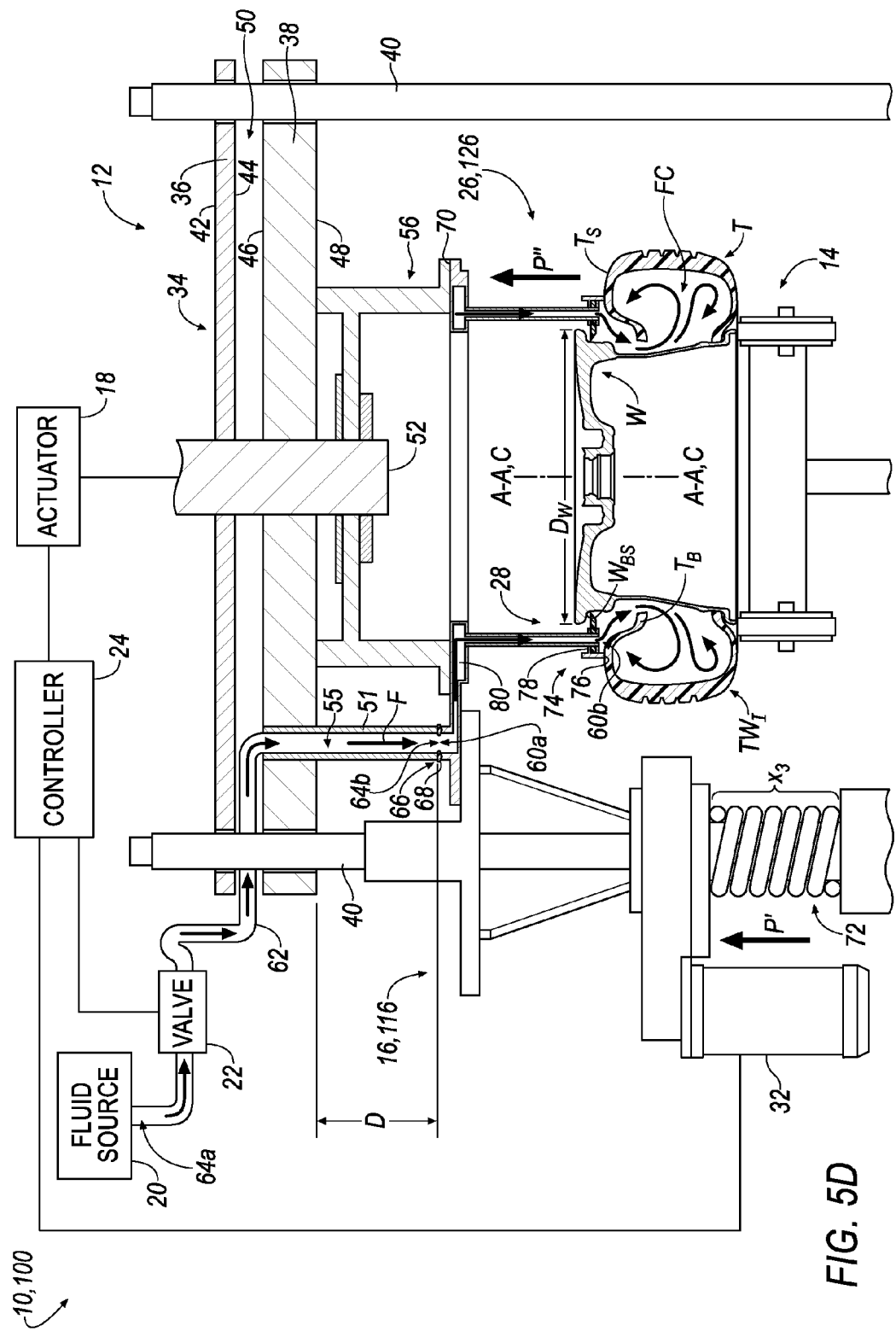

Referring to FIG. 5D, in an embodiment, movement of the plunger portion 34 of the support structure 12 according to the direction of the arrow, P, ceases at approximately the moment when the substantially annular, ring-shaped seal portion 28 is moved to the sealed, seated position adjacent the bead seat, $W_{BS}$, of the wheel, W. Once the substantially annular, ring-shaped seal portion 28 is located adjacent the bead seat, $W_{BS}$, of the wheel, W, in an embodiment, a fluid cavity, FC, of the un-inflated tire-wheel assembly, $TW_U$, is sealed off by the "use orientation" inflator head (due to the positioning of the substantially annular, ring-shaped seal portion 28 adjacent the bead seat, $W_{BS}$, of the wheel, W, and the axially-projecting, annular rim body 76 of the engaging assembly 74 engaging the sidewall, $T_S$, of the tire, T) of the plurality of inflator heads 26, 126 such that fluid, F, from the fluid source 20 may be moved to be within the fluid cavity, FC, upon the controller 24 moving the valve 22 from a closed orientation to an opened orientation. Further, as seen in FIG. 5D, the biasing member 72 is further moved from the partially compressed orientation (defined by length, $X_2$) to a fully compressed orientation (defined by length, $X_3$).

In an embodiment, it will be appreciated that the fluid, F, may be pressurized or compressed such that the fluid, F, may be automatically evacuated from the fluid source 20 and into the fluid cavity, FC. Further, in an embodiment, it will be appreciated that the fluid source 20 and valve 22 may be excluded from the design of the inflator apparatus 10, 100 in favor of, for example, a pump (not shown) connected to the controller 24 and fluid conduit 62; in an embodiment, the controller 24, for example, may activate the pump such that the pump may move fluid, F (e.g. ambient air), from ambient surroundings, through the fluid conduit 62 and into the fluid cavity, FC. When the fluid cavity, FC, is pressurized to a desired amount, the controller 24 may deactivate the pump.

With continued reference to FIG. 5D, upon moving the valve 22 to the opened orientation, the fluid, F, is passed through the fluid conduit 62, and into the fluid inlet 60a of the "use orientation" inflator head of the plurality of inflator heads 26, 126. Once provided into the fluid inlet 60a, the fluid, F, is then passed through a fluid channel 80 formed by the "use orientation" inflator head of the plurality of inflator heads 26, 126, and out of the fluid outlet 60b such that the fluid, F, may be deposited into the fluid cavity, FC. In an embodiment, the fluid channel 80 may extend through a passage formed by one or more of the substantially annular, ring-shaped seal portion 28 and the radially-projecting, annular rim body 78. Further, in an embodiment, an end of the fluid channel 80 may form the fluid outlet 60b. Yet even further, in an embodiment, an end of the fluid channel 80 forming the fluid outlet 60b may be, for example, crimped or swaged in order to retain the substantially annular, ring-shaped seal portion 28 adjacent the radially-projecting, annular rim body 78.

In an embodiment, the fluid, F, may quickly fill the volume of the fluid cavity, FC, as the fluid, F, flows out of the fluid outlet 60b and into the fluid cavity, FC. As the fluid, F, fills the fluid cavity, FC, which is formed by the tire, T, and wheel, W, the sidewall, $T_S$, of the tire, T, starts to push the plunger portion 34 away from the now-inflated tire-wheel assembly, $TW_I$, according to the direction of the arrow, P''', which is opposite the direction of the arrow, P.

Figure 5E:
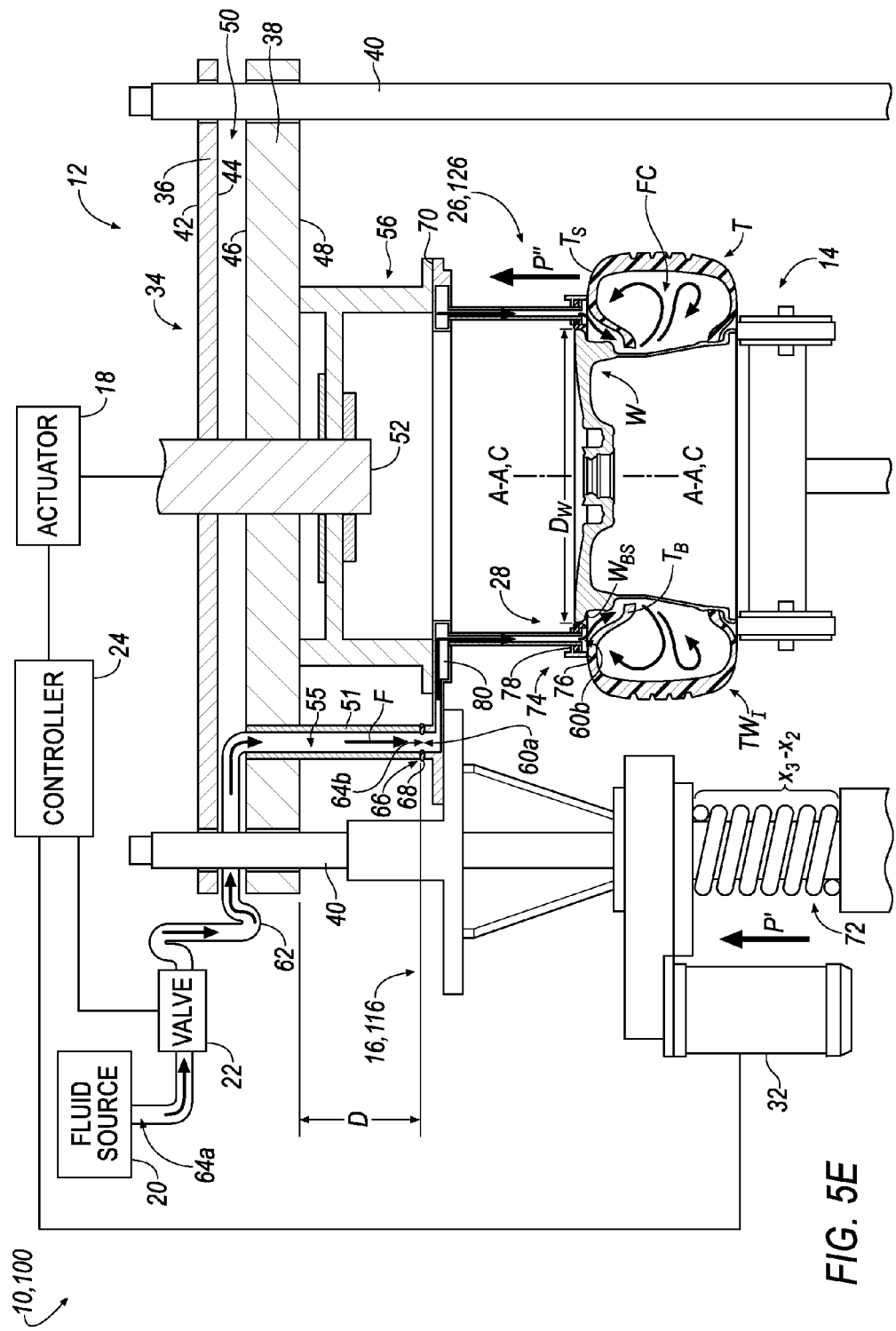

Referring to FIG. 5E, as the plunger portion 34 is moved further according to the direction of the arrow, P''', by way of forces arising from the sidewall, $T_S$, of the tire, T, the biasing member 72, begins to release energy and assists the force, P''', arising from the inflated tire, T, by also pushing the plunger portion 34 according to the direction of the arrow, P'. As seen in FIG. 5E, the biasing member 72 is moved from the fully compressed orientation (defined by length, $X_3$) to a partially expanded orientation (defined by length, $X_3-X_2$).

As the sidewall, $T_S$, of the tire, T, and the biasing member 72 move the plunger portion 34 according to the direction of the arrows, P', P''', the substantially annular, ring-shaped seal portion 28 is moved from the sealed, substantially planar, neutral orientation adjacent the bead seat, $W_{BS}$, of the wheel, W, such that the substantially annular, ring-shaped seal portion 28 becomes unseated from the bead seat, $W_{BS}$, of the wheel, W, and "flips" downwardly, away from the sealed, substantially planar, neutral orientation. As seen in FIG. 5E, the substantially annular, ring-shaped seal portion 28 remains disposed adjacent the diameter, $D_W$, of the wheel, W, until the fluid, F, fills the fluid cavity, FC, thereby causing the substantially annular, ring-shaped seal portion 28 to be moved away from the bead seat, $W_{BS}$, of the wheel, W, such that a bead, $T_B$, of the tire, T, may become automatically seated (see, e.g., FIG. 5F) adjacent the bead seat, $W_{BS}$, of the wheel, W.

Figure 5F:
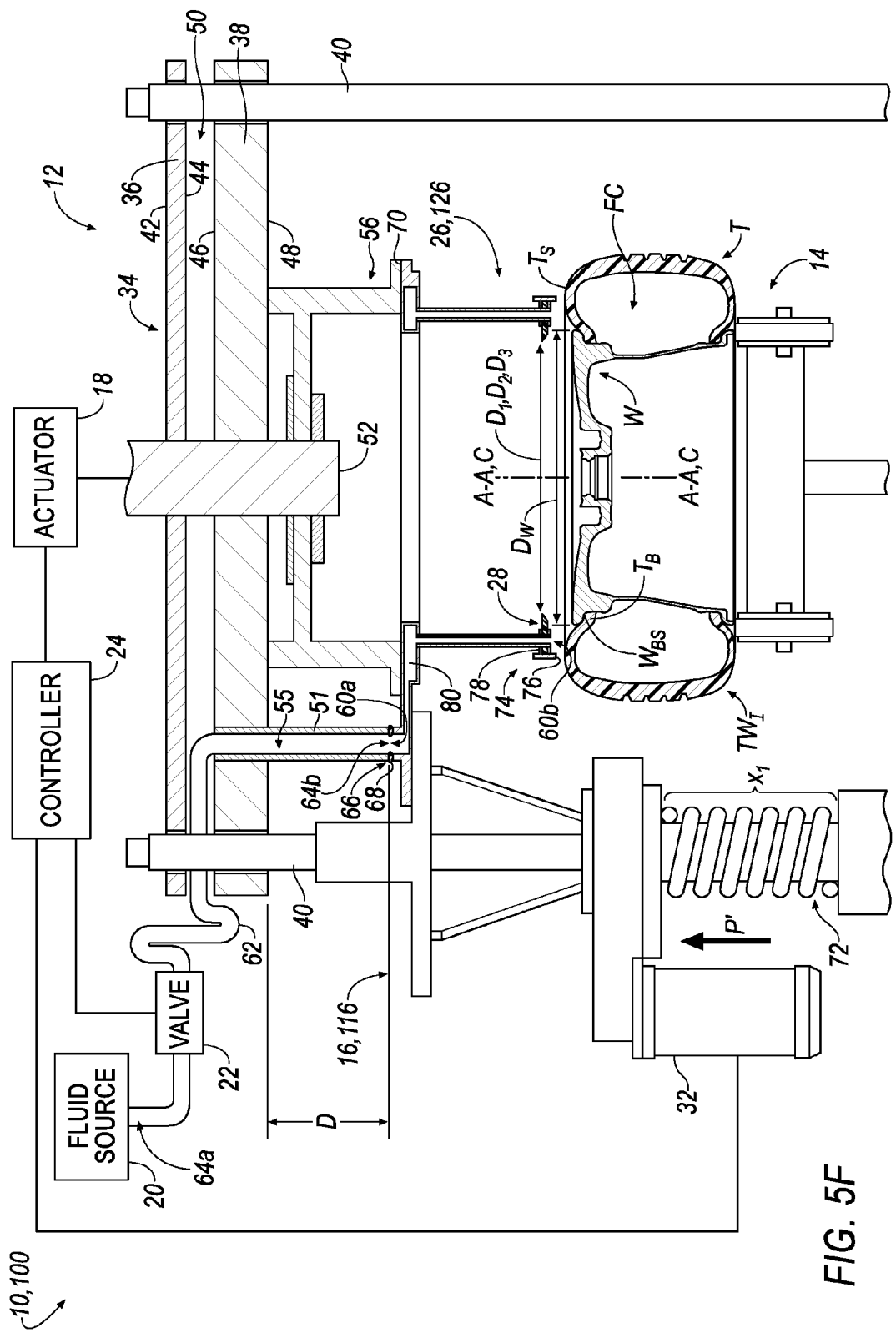

Referring to FIG. 5F, upon the bead, $T_B$, of the tire, T, becoming seated adjacent the bead seat, $W_{BS}$, of the wheel, W, the valve 22 may be moved from the opened orientation to the closed orientation in order to cease the flow of fluid, F, from the source of fluid source, 20. Further, the "use orientation" of the inflator head of the plurality of inflator heads 26, 126 may be further moved away from the inflated tire-wheel assembly, $TW_I$, according to the direction of the arrow, P', by way of further energy being released from the biasing member 72 as the biasing member expands from the partially expanded orientation (defined by length, $X_3-X_2$) to the expanded orientation (defined by length, $X_1$). In an embodiment, the movement of the "use orientation" inflator head of the plurality of inflator heads 26, 126 according to the direction of the arrow, P', may be further caused by, for example, the actuator portion 18 pulling the plunger portion 34 away from the inflated tire-wheel assembly, $TW_I$. Further, it will be appreciated that the movement of the "use orientation" inflator head of the plurality of inflator heads 26, 126 according to the direction of the arrow, P', may also result in the fluid outlet 64b of the fluid conduit 62 being physically disconnected from the fluid inlet 60a of the "use orientation" inflator head of the plurality of inflator heads 26, 126.

Referring now to FIGS. 6A-6D, a system is shown generally at 200 according to an embodiment of the invention. Further, as seen as FIGS. 6A-6D, a method for utilizing the system 200 for assembling an un-inflated tire-wheel assembly, $TW_U$, and loading the assembled, un-inflated tire-wheel assembly, $TW_U$, onto the conveyor portion 14 is shown according to an embodiment of the invention. In an embodiment, the system 200 is illustrated to include the inflator apparatus 10; however, it will be appreciated that the system 200 is not limited to including the inflator apparatus 10 and that the system 200 may include, but is not limited to including, for example, the inflator apparatus 100.

In addition to the inflator apparatus 10, the system 200 may include, in an embodiment, a first robotic arm 202a, a second robotic arm 202b, at least one first tire-supplying conveyor 204 corresponding to the first robotic arm 202a, at least one second tire-supplying conveyor 206 corresponding to the second robotic arm 202b and at least one wheel-supplying conveyor 208 that may correspond to either of the first and second robotic arms 202a, 202b.

In an embodiment, the at least one first tire-supplying conveyor 204 includes three conveyors 204a, 204b, 204c. In an embodiment, each conveyor 204a, 204b, 204c of the at least one first tire-supplying conveyor 204 transports tires having a geometry that is exclusive to that conveyor 204a, 204b, 204c; as such, in an embodiment, it will be appreciated that, comparatively, the geometry of tires, T, is different for each conveyor 204a, 204b, 204c. In an embodiment, for example, the tires, T, on conveyor 204a include a smaller opening diameter than tires, T, on conveyor 204b, and, in an embodiment, the opening diameter of the tires, T, on conveyor 204b include a smaller opening diameter than tires, T, on conveyor 204c.

In an embodiment, the at least one second tire-supplying conveyor 206 includes three conveyors 206a, 206b, 206c. In an embodiment, the conveyors 206a, 206b, 206c transport a plurality of tires, T, in a substantially similar manner as described above with respect to the conveyors 204a, 204b, 204c.

In an embodiment, the at least one wheel-supplying conveyor 208 includes three conveyors 208a, 208b, 208c. In an embodiment, each conveyor 208a, 208b, 208c of the at least one wheel-supplying conveyor 208 transports wheels, W, having a geometry (e.g., a wheel diameter) that is exclusive to that conveyor 208a, 208b, 208c; as such, in an embodiment, it will be appreciated that, comparatively, the geometry of wheels, W, is different for each conveyor 208a, 208b, 208c. In an embodiment, for example, the wheels, W, on conveyor 208a include a smaller diameter than wheels, W, on conveyor 208b, and, in an embodiment, the diameter of the wheels, W, on conveyor 208b include a smaller diameter than wheels, W, on conveyor 208c.

In an embodiment, the tires, T, and wheels, W, may be located on the one or more conveyors 204, 206, 208 in a selected fashion. In an embodiment, the geometry of tires, T, on conveyors 204a, 206a correspond to the geometry of wheels, W, on conveyor 208a. In an embodiment, the geometry of tires, T, on conveyors 204b, 206b correspond to the geometry of wheels, W, on conveyor 208b. In an embodiment, the geometry of tires, T, on conveyors 204c, 206c correspond to the geometry of wheels, W, on conveyor 208c.

It will be appreciated that one or more of the controller 24 and sensor 30 may be connected to the robotic arms 202a, 202b in order to provide instructions to the robotic arms 202a, 202b for causing movements of the robotic arms 202a, 202b to specific conveyors 204, 206, 208 for assembling a particular un-inflated tire-wheel assembly, $TW_U$. An embodiment of selected movements of the robotic arms 202a, 202b will now be described in the foregoing disclosure.

In an embodiment, each of the first and second robotic arms 202a, 202b may be rotatably-supported on platforms 210. Further, in an embodiment, each of the first and second robotic arms 202a, 202b may include including telescoping sections 212, joints, and the like in order to permit the orientation of the first and second robotic arms 202a, 202b to expand, contract, rise, lower, pivot, bend or adjust to any desirable configuration for moving to/from one or more of the conveyors 14, 204, 206, 208.

Figure 6A:
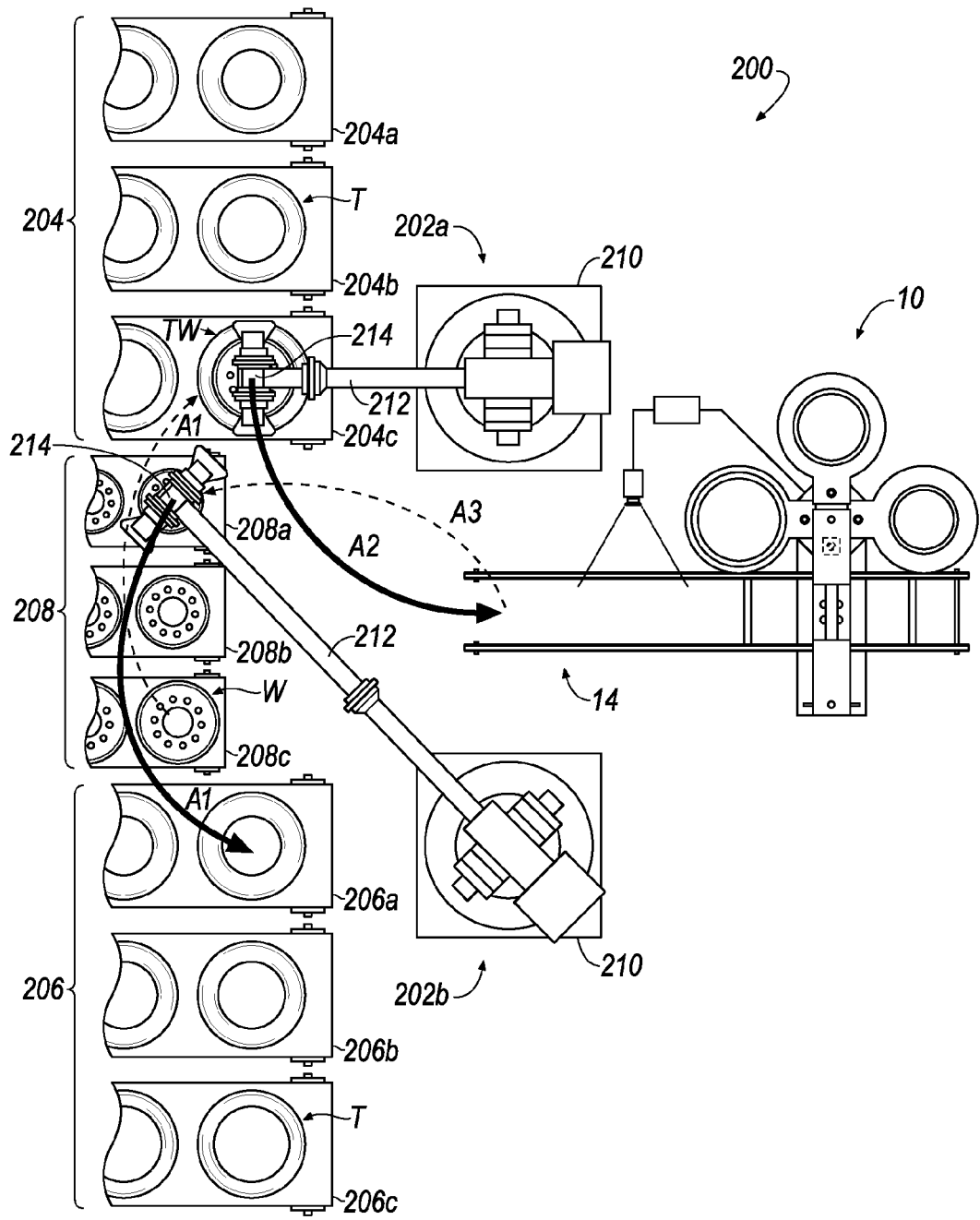
FIGS. 6A-6D illustrate top views of a system for assembling and inflating a tire-wheel assembly in accordance with an exemplary embodiment of the invention.

In an embodiment, a method for assembling and inflating an un-inflated tire-wheel assembly, $TW_U$, is described according to an embodiment in FIGS. 6A-6D. In an embodiment, as seen in FIG. 6A, each of the first and second robotic arms 202a, 202b function by firstly retrieving a wheel, W, from the at least one wheel-supplying conveyor 208. Retrieval of the wheel, W, is caused an end effecter 214 of the robotic arm 202a, 202b grasping or otherwise engaging the wheel, W.

Once the wheel, W, is engaged at the at least one wheel-supplying conveyor 208, the robotic arm 202a, 202b transports the wheel, W, to the at least one tire conveyor 204, 206 corresponding to the robotic arm 202a, 202b according to the direction of the arrow, A1. Once, the wheel, W, is moved to the at least one tire conveyor 204, 206, the robotic arm 202a, 202b inserts the wheel, W, through the diameter opening of the tire, T, while the end effecter 214 maintains contact/engagement with the wheel, W.

Once the wheel, W, is inserted through the diameter opening of the tire, T, the wheel, W, and tire, T, may be loosely attached to one another in order to define an un-inflated tire-wheel assembly, $TW_U$. While the end effecter 214 maintains contact/engagement with the wheel, W, the robotic arm 202a, 202b moves the un-inflated tire-wheel assembly, $TW_U$, to the conveyor portion 14 of the inflation apparatus 10 according to the direction of the arrow, A2.

Figure 6B:
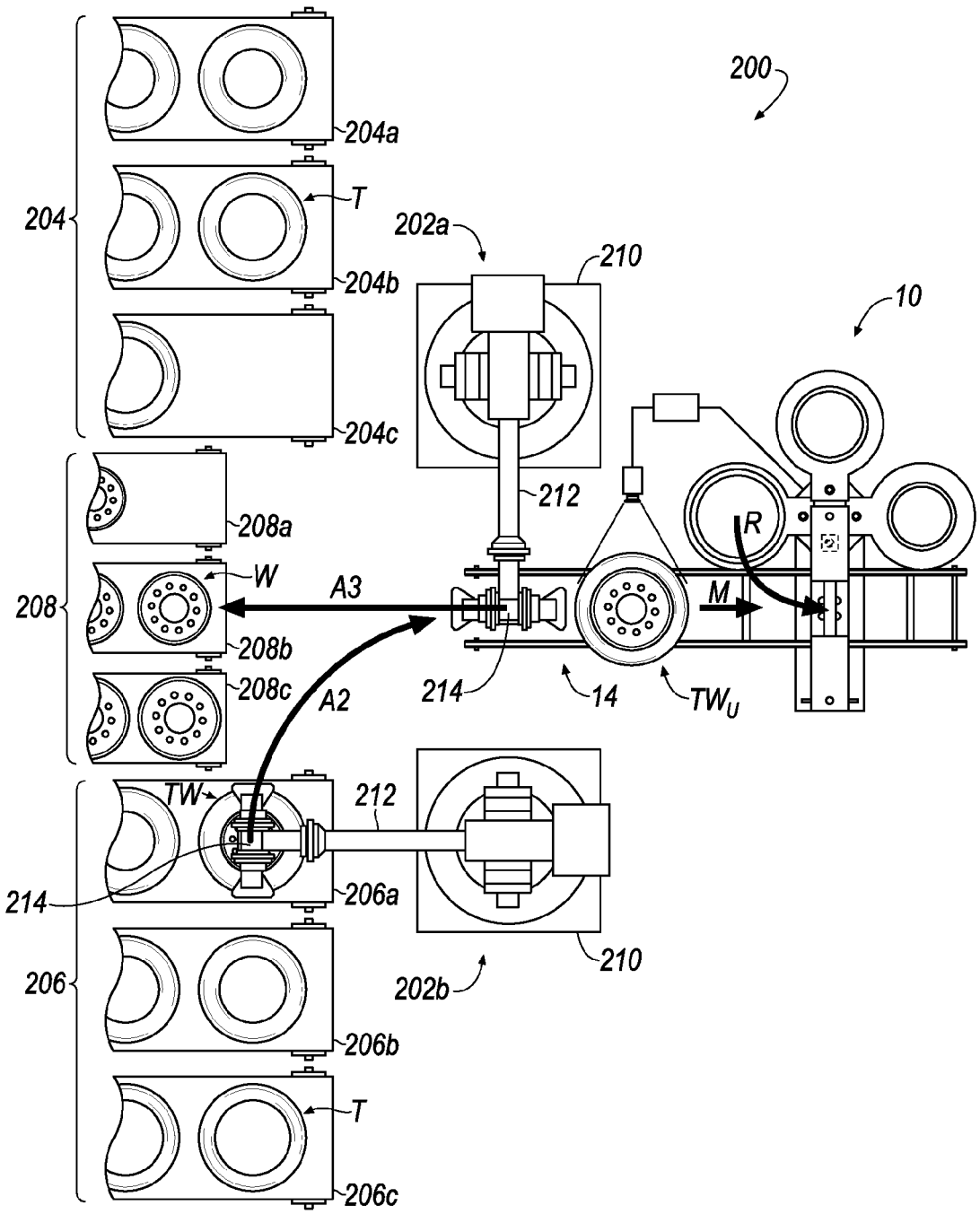
Figure 6C:
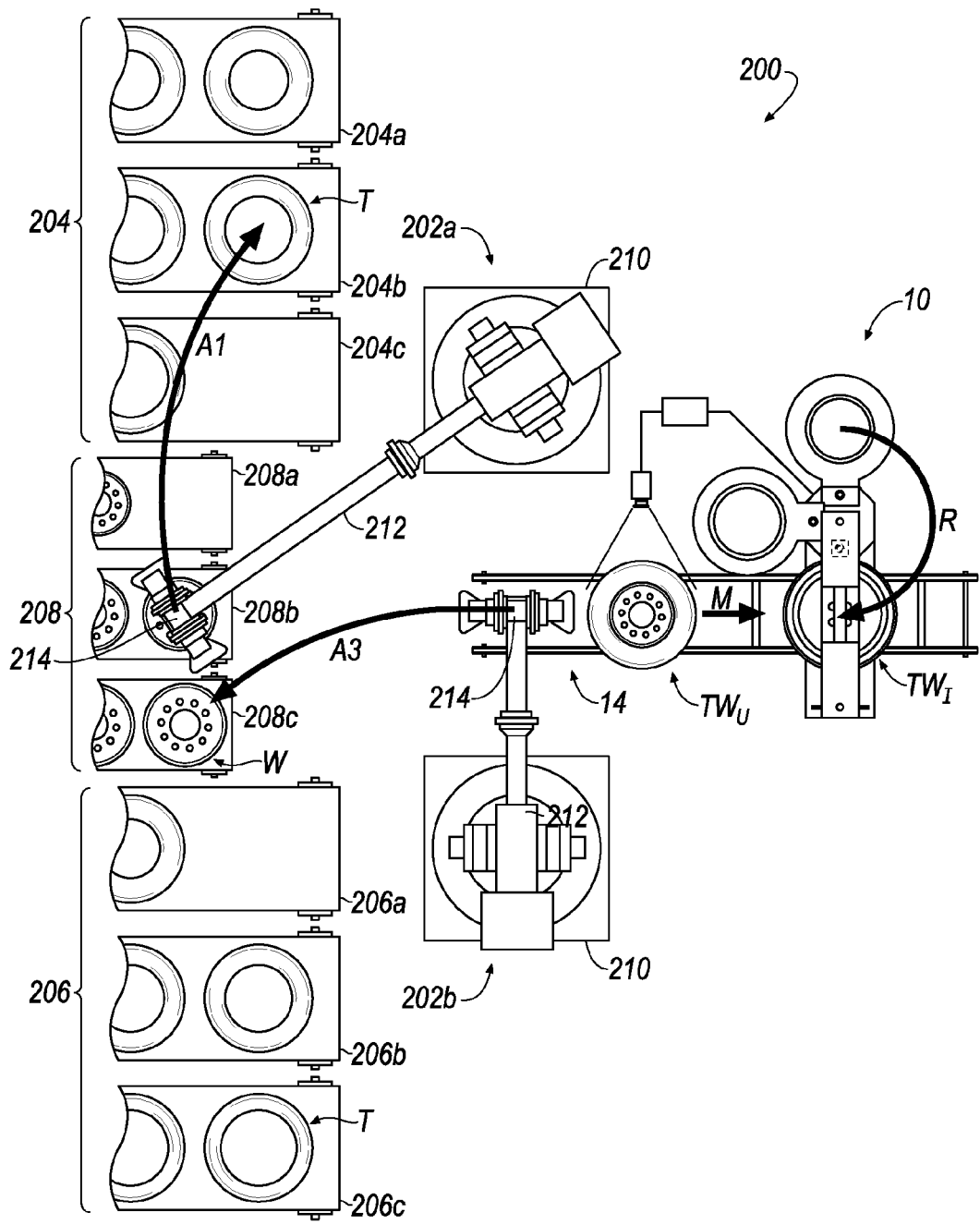
Figure 6D:
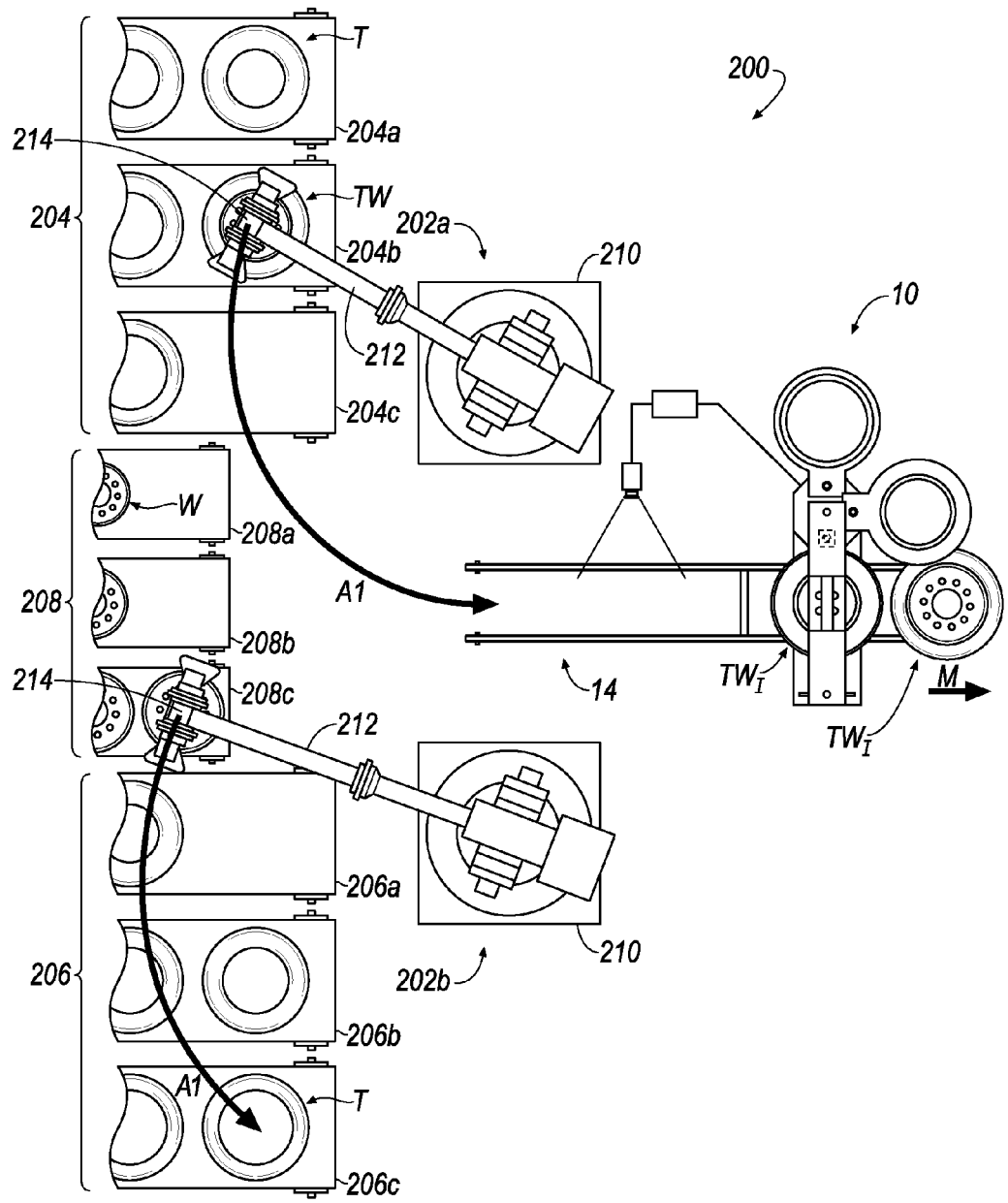

Referring to FIG. 6B, once the un-inflated tire-wheel assembly, $TW_U$, is located at the conveyor portion 14 of the inflation apparatus 10, the end effecter 214 may disengage the wheel, W, such that the un-inflated tire-wheel assembly, $TW_U$, is no longer attached to the robotic arm 202a, 202b. The un-inflated tire-wheel assembly, $TW_U$, is then free to be moved by the conveyor portion 14 according to the direction of the arrow, M, for subsequent inflation by the inflation apparatus 10 as described above. The robotic arm 202a, 202b may then be moved according to the direction of the arrow, A3, in order to locate the robotic arm 202a, 202b at the at least one wheel-supplying conveyor 208 to repeat the assembling operation described above.

In an embodiment, it will be appreciated that the system 200 is not limited to first and second robotic arms 202a, 202b and that the system 200 may include any desirable number of robotic arms 202a, 202b. In an embodiment, the system 200 includes two robotic arms 202a, 202b because a complete series of movements (e.g., A1, A2, A3) of one of the robotic arms 202a, 202b during the assembling operation of the un-inflated tire-wheel assembly, $TW_U$, takes approximately twice as long as the inflation operation (see, e.g., FIGS. 5A-5F) conducted by the inflation apparatus 10, 100 (i.e., use of one robotic arm 202a, 202b results in a two-to-one (2:1), ratio of assembly time to inflation time). As such, it will be appreciated that by providing two robotic arms 202a, 202b, a one-to-one (1:1) ratio of assembly time to inflation time may be achieved such that the inflation apparatus 10 is not left idling/waiting for one robotic arm 202a, 202b to finish its assembling operation.

Further, in an embodiment, it will be appreciated that the use of nine conveyors 204a-204c, 206a-206c, 208a-208c permits the system 200 to selectively manufacture at least three differently-sized tire-wheel assemblies in a relatively fast fashion. Further, it will be appreciated that although only nine conveyors 204a-204c, 206a-206c, 208a-208c are shown in the illustrated embodiment, it will be appreciated that the invention is not limited to a particular number of conveyors; for example, the system 200 could alternatively include eighteen conveyors in order to manufacture at least six differently-sized tire-wheel assemblies. It will be appreciated, however, that although eighteen conveyors may be provided, the inflation apparatus 100 may be included instead of the inflation apparatus 10 in order to provide the ability to inflate the six differently-sized tire-wheel assemblies.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An inflator apparatus for inflating an un-inflated tire-wheel assembly, comprising:
   a support structure;
   an interface portion rotatably-attached to the support structure, wherein the interface portion includes a plurality of inflator heads, wherein each inflator head of the plurality of inflator heads includes: an array of axially-projecting fluid channels supported by an upper annular rim body and a lower annular rim body, wherein each axially-projecting fluid channel of the array of axially-projecting fluid channels defines a fluid outlet, wherein each axially-projecting fluid channel of the array of axially-projecting fluid channels includes a fluid inlet;
   a plunger portion movably-connected to the support structure, wherein the plunger portion is movably-connected to the support structure to permit selective coupling of the plunger portion with one inflator head of the plurality of inflator heads; and
   a fluid conduit connected to the plunger portion, wherein the fluid conduit is fluidly connectable with the fluid inlet of each axially-projecting fluid channel of the array of axially-projecting fluid channels of the one inflator head of the plurality of inflator heads.

2. The inflator apparatus according to claim 1, wherein the fluid conduit is fluidly connectable with the fluid inlet of each axially-projecting fluid channel of the array of axially-projecting fluid channels of the one inflator head of the plurality of inflator heads upon selective coupling of the plunger portion with the one inflator head of the plurality of inflator heads.

3. The inflator apparatus according to claim 1, wherein each inflator head of the plurality of inflator heads includes:
   a flexible, radially-inwardly-projecting, substantially annular, ring-shaped seal portion, wherein the flexible, radially-inwardly-projecting, substantially annular, ring-shaped seal portion of each inflator head of the plurality of inflator heads includes a unique inner diameter, wherein the lower annular rim body supports the flexible, radially-inwardly-projecting, substantially annular, ring-shaped seal portion.

4. The inflator apparatus according to claim 3, wherein the unique inner diameter of each inflator head of the plurality of inflator heads provides:
   means for permitting the inflator apparatus to inflate more than one un-inflated tire-wheel assembly, wherein each un-inflated tire-wheel assembly of the more than one un-inflated tire-wheel assembly includes a different geometry, wherein the different geometry includes a different wheel diameter, wherein the different wheel diameter corresponds to one of the unique inner diameters of each inflator head of the plurality of inflator heads.

5. The inflator apparatus according to claim 1, wherein the plunger portion provides:
   means for moving the interface portion for causing the one inflator head of the plurality of inflator heads to selectively engage the un-inflated tire-wheel assembly.

6. The inflator apparatus according to claim 5, further comprising:
   an actuator portion connected to the plunger portion, wherein the actuator portion causes axial movement of the plunger portion that results in the plunger portion moving the interface portion.

7. The inflator apparatus according to claim 1, further comprising:
   a conveyor portion extending through the support structure;
   a valve connected to the fluid conduit;
   a motor connected to the interface portion; and
   a controller connected to one or more of: the conveyor portion, the valve and the motor.

8. The inflator apparatus according to claim 7, wherein the connection of the conveyor portion to the controller provides:
   means for moving the un-inflated tire-wheel assembly to a position such that an axial center of the un-inflated tire-wheel assembly is coaxially aligned with an axial center of the one inflator head of the plurality of inflator heads.

9. The inflator apparatus according to claim 7, further comprising:
   a fluid source connected to a fluid inlet of the fluid conduit, wherein the connection of the valve to the controller provides
   means for changing an orientation of the valve to be placed in one of a closed orientation and an opened orientation, wherein the closed orientation of the valve prevents movement of fluid from within the fluid source through the fluid conduit, wherein the opened orientation of the valve permits movement of the fluid from within the fluid source through the fluid conduit.

10. The inflator apparatus according to claim 7, wherein the connection of the motor to the controller provides:
    means for rotating the interface portion for aligning the fluid inlet of each axially-projecting fluid channel of the array of axially-projecting fluid channels of the one inflator head of the plurality of inflator heads with a fluid outlet formed by one or more of the fluid conduit and the plunger portion for permitting the fluid conduit to be fluidly connectable with the fluid inlet of each axially-projecting fluid channel of the array of axially-projecting fluid channels of the one inflator head of the plurality of inflator heads.

11. The inflator apparatus according to claim 10, further comprising:
    a sensor connected to the controller, wherein the connection of the sensor and controller provide
    means for determining a geometry of the un-inflated tire-wheel assembly and subsequently comparing the determined geometry of the un-inflated tire-wheel assembly to a geometry of each inflator head of the plurality of inflator heads for selecting one inflator head of the plurality of inflator heads to be rotated to a use orientation in order to align the fluid inlet of each axially-projecting fluid channel of the array of axially-projecting fluid channels of the one inflator head of the plurality of inflator heads with the fluid outlet formed by the plunger portion.

12. A system for processing more than one un-inflated tire-wheel assembly, comprising:
    an assembling apparatus for assembling the more than one un-inflated tire-wheel assembly, wherein the assembling apparatus includes: a first robotic arm, a second robotic arm, at least one wheel-supplying conveyor arranged within reach of both of the first robotic arm and the second robotic arm, at least one first tire-supplying conveyor arranged within reach of the first robotic arm, and at least one second tire-supplying conveyor arranged within reach of the second robotic arm; and an inflator for inflating the more than one un-inflated tire-wheel assembly assembled by the assembling apparatus, wherein the inflator includes: a support structure; an interface portion rotatably-attached to the support structure, wherein the interface portion includes a plurality of inflator heads, wherein each inflator head of the plurality of inflator heads includes a fluid inlet; a plunger portion movably-connected to the support structure, wherein the plunger portion is movably-connected to the support structure to permit selective coupling of the plunger portion with one inflator head of the plurality of inflator heads; and a fluid conduit connected to the plunger portion, wherein the fluid conduit is fluidly connectable with the fluid inlet of the one inflator head of the plurality of inflator heads.

13. A method for utilizing an inflator apparatus for inflating more than one un-inflated tire-wheel assembly, comprising the steps of:

providing a support structure including a plunger portion, wherein the plunger portion is movably-attached to the support structure about a plunging axis extending through the support structure;

providing an interface portion that is rotatably-attached to the support structure, wherein the interface portion includes a plurality of inflator heads;

rotating the interface portion for coaxially-aligning an axial center of one inflator head of the plurality of inflator heads with the plunging axis;

providing at least one wheel-supplying conveyor for supplying wheels directly to both of a first robotic arm and a second robotic arm;

providing at least one first tire-supplying conveyor for supplying tires directly to the first robotic arm;

providing at least one second tire-supplying conveyor for supplying tires directly to the second robotic arm;

utilizing the first robotic arm and the second robotic arm for assembling an un-inflated tire-wheel assembly from the supplies tires and wheels;

moving the un-inflated tire-wheel assembly upon a conveyor portion to a position such that an axial center of the un-inflated tire-wheel assembly is coaxially-aligned with the axial center of the one inflator head; and axially moving the plunger portion for inflating the un-inflated tire-wheel assembly.

14. The method according to claim 13, wherein the axially moving step includes:

firstly, axially coupling the plunger portion with the interface portion for fluidly connecting the plunger portion to the one inflator head of the plurality of inflator heads, and secondly, axially coupling the interface portion to the un-inflated tire-wheel assembly.

15. The method according to claim 14, wherein the inflating step includes:

moving a valve from a closed orientation to an open orientation for permitting fluid from a fluid source to move through the plunger portion and the one inflator head of the plurality of inflator heads and into a fluid cavity formed by the un-inflated tire-wheel assembly.

16. The system according to claim 12, wherein:

the at least one wheel-supplying conveyor is capable of supplying wheels directly to both of the first robotic arm and the second robotic arm, the at least one first tire-supplying conveyor is capable of supplying tires directly to the first robotic arm, and the at least one second tire-supplying conveyor is capable of supplying tires directly to the second robotic arm.

* * * * *